(12) United States Patent
Hayashi et al.

(10) Patent No.: US 9,910,560 B2
(45) Date of Patent: Mar. 6, 2018

(54) ELECTRONIC APPARATUS AND MENU DISPLAYING METHOD

(71) Applicant: Sony Computer Entertainment Inc., Tokyo (JP)

(72) Inventors: Masakazu Hayashi, Tokyo (JP); Kensaku Ishizuka, Tokyo (JP); Eiji Yamada, Tokyo (JP); Yuki Kobayashi, Kanagawa (JP); Manabu Nishizawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/647,240

(22) PCT Filed: Sep. 17, 2013

(86) PCT No.: PCT/JP2013/005489
§ 371 (c)(1),
(2) Date: May 26, 2015

(87) PCT Pub. No.: WO2014/091645
PCT Pub. Date: Jun. 19, 2014

(65) Prior Publication Data
US 2015/0317043 A1 Nov. 5, 2015

(30) Foreign Application Priority Data
Dec. 10, 2012 (JP) ................... 2012-269741

(51) Int. Cl.
*G06F 3/041* (2006.01)
*G06F 3/0482* (2013.01)
(Continued)

(52) U.S. Cl.
CPC .......... *G06F 3/0482* (2013.01); *G06F 3/0412* (2013.01); *G06F 3/0485* (2013.01);
(Continued)

(58) Field of Classification Search
CPC .... G06F 3/0482; G06F 3/0485; G06F 3/0488; G06F 3/0489; G06F 3/04817; H04N 5/44543
(Continued)

(56) References Cited

U.S. PATENT DOCUMENTS

| | | | |
|---|---|---|---|
| 6,396,477 B1 | 5/2002 | Hinckley | |
| 2003/0071855 A1 | 4/2003 | Kim | |

(Continued)

FOREIGN PATENT DOCUMENTS

| | | |
|---|---|---|
| CN | 102414642 A | 4/2012 |
| CN | 102693074 A | 9/2012 |

(Continued)

OTHER PUBLICATIONS

International Search Report for corresponding PCT application No. PCT/JP2013/005489, dated Oct. 22, 2013.

(Continued)

*Primary Examiner* — Yuzhen Shen
(74) *Attorney, Agent, or Firm* — Matthew B. Dernier

(57) ABSTRACT

An operation button carries out an operation of an electronic apparatus through a key input. A touch panel is a display area of the electronic apparatus and carries out an operation of the electronic apparatus through a touch operation. A display controlling unit displays, in response to the operation of at least one of the operation button and the touch panel, a menu including at least one choice relating to the operation of the electronic apparatus on a display device. Here, the display controlling unit displays a menu to be displayed in response to the operation of the operation button and a menu to be displayed in response to the operation of the touch panel such that the menus include at least one common choice and besides the common choice is disposed in layouts different from each other.

10 Claims, 14 Drawing Sheets

(51) Int. Cl.
  *G06F 3/0481* (2013.01)
  *G06F 3/0485* (2013.01)
  *G06F 3/0488* (2013.01)
  *G06F 3/0489* (2013.01)

(52) U.S. Cl.
  CPC .......... *G06F 3/0488* (2013.01); *G06F 3/0489* (2013.01); *G06F 3/04817* (2013.01); *G06F 2203/0382* (2013.01); *G06F 2203/04101* (2013.01); *G06F 2203/04104* (2013.01); *G06F 2203/04806* (2013.01); *G06F 2203/04808* (2013.01)

(58) Field of Classification Search
  USPC .................................................. 345/168, 163
  See application file for complete search history.

(56) References Cited

U.S. PATENT DOCUMENTS

| | | | |
|---|---|---|---|
| 2009/0024926 A1 | 1/2009 | Morotomi | |
| 2009/0138827 A1* | 5/2009 | Van Os | G06F 3/04817 715/846 |
| 2009/0307633 A1 | 12/2009 | Haughay, Jr. | |
| 2009/0310010 A1 | 12/2009 | Matsushima | |
| 2009/0310957 A1 | 12/2009 | Matsushima | |
| 2010/0007613 A1* | 1/2010 | Costa | G06F 1/1601 345/173 |
| 2010/0277414 A1 | 11/2010 | Tartz | |
| 2011/0055763 A1* | 3/2011 | Utsuki | G06F 3/04817 715/835 |
| 2011/0234857 A1 | 9/2011 | Matsushima | |
| 2011/0250956 A1* | 10/2011 | Tsuda | G06F 3/0482 463/30 |
| 2012/0174044 A1* | 7/2012 | Koga | G06F 3/04883 715/863 |
| 2012/0179997 A1* | 7/2012 | Miyazaki | G06F 3/04842 715/830 |
| 2012/0188281 A1* | 7/2012 | Nishina | G01C 21/20 345/634 |
| 2013/0097550 A1* | 4/2013 | Grossman | G06F 3/0488 715/779 |
| 2013/0187855 A1* | 7/2013 | Radakovitz | G06F 3/0488 345/163 |
| 2013/0191779 A1* | 7/2013 | Radakovitz | G06F 3/0488 715/800 |
| 2013/0191781 A1* | 7/2013 | Radakovitz | G06F 9/4443 715/810 |
| 2013/0290986 A1* | 10/2013 | Kobayashi | G06F 3/01 719/318 |

FOREIGN PATENT DOCUMENTS

| | | | |
|---|---|---|---|
| EP | 2487576 A2 | 8/2012 | |
| EP | 2525271 A2 | 11/2012 | |
| JP | 2008242735 A | 10/2008 | |
| JP | 2010033538 A | 2/2010 | |
| JP | 2011065559 A | 3/2011 | |
| JP | 2011118605 A | 6/2011 | |
| JP | 2011204175 A | 10/2011 | |
| JP | WO2012101863 * | 8/2012 | ............... G06F 3/01 |
| JP | 2012238236 A | 12/2012 | |

OTHER PUBLICATIONS

EP Search Report on Patentability for corresponding EP Application No. 13863011.6, 10 pages, dated Jun. 8, 2016.
"Quick Start Guide" XP55276544. Retrieved from the Internet: URL:https:jjwww.playstation.comjmanualjpdf/PCH-10011101-1.0 2.pdf/ 2 pages, Feb. 28, 2012.
IGN: "How to Use PlayStation Vita Content Manager" XP054976567; Retrieved from the Internet:URL:https:jjwww.youtube.comjwatch?v=qHAOLSaqrRg 1 page, Dec. 22, 2011.
Office Action for corresponding JP application No. JP2012-269741, dated Sep. 15, 2015.
International Preliminary Report on Patentability and Written Opinion for corresponding PCT application No. PCT/JP2013/005489, 8 pages, dated Jun. 25, 2015.
Office Action for corresponding CN Application No. 201380063201, 14 pages, dated Mar. 31, 2017.

* cited by examiner

FIG. 1
(a)
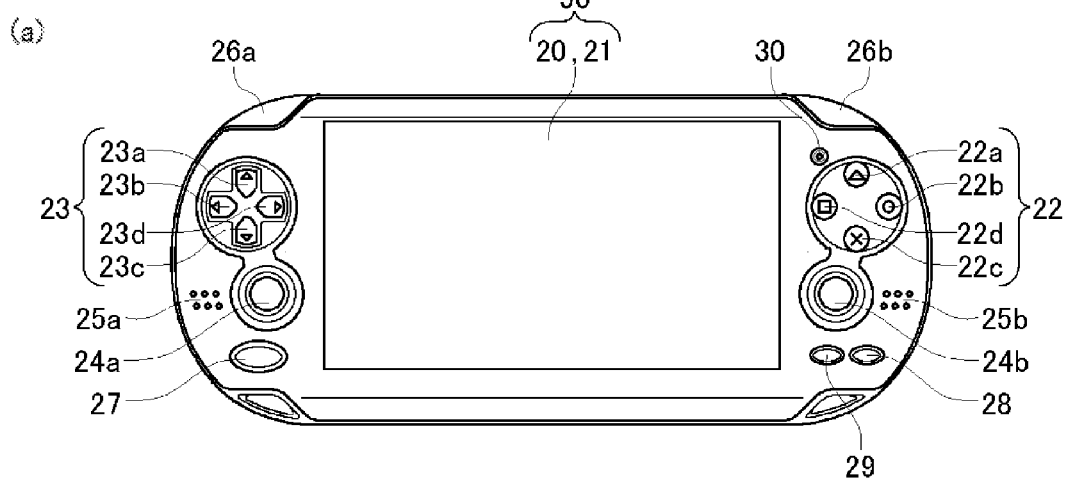
10
(b)
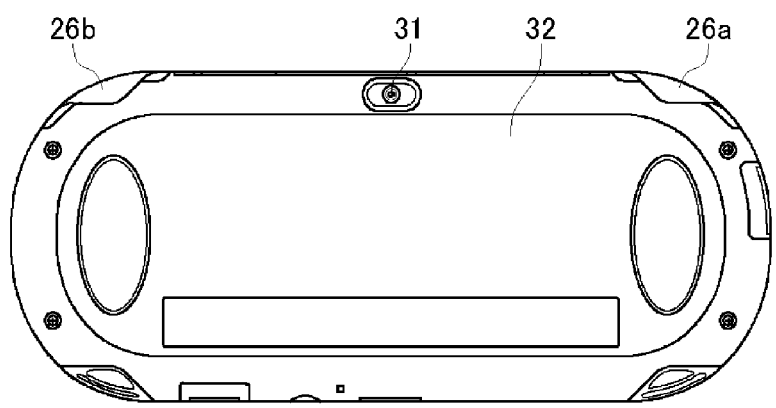
10

FIG.2
(a) 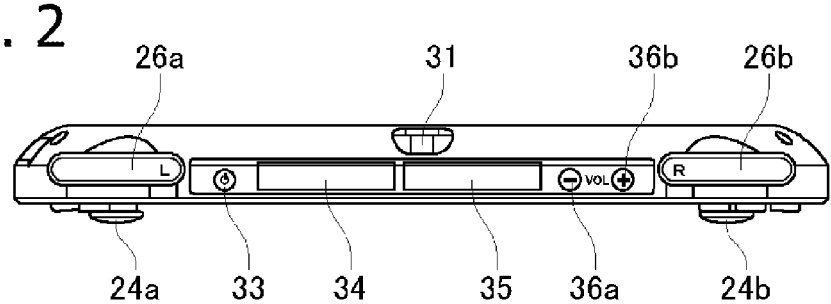
(b) 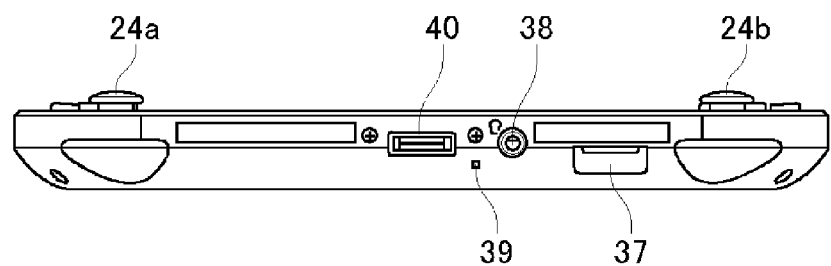
(c) 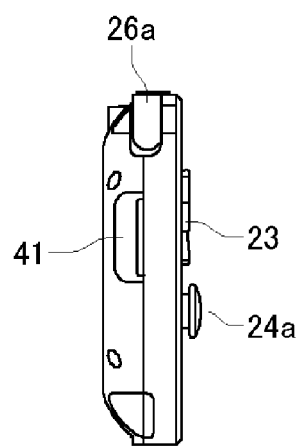

FIG. 5
(a) 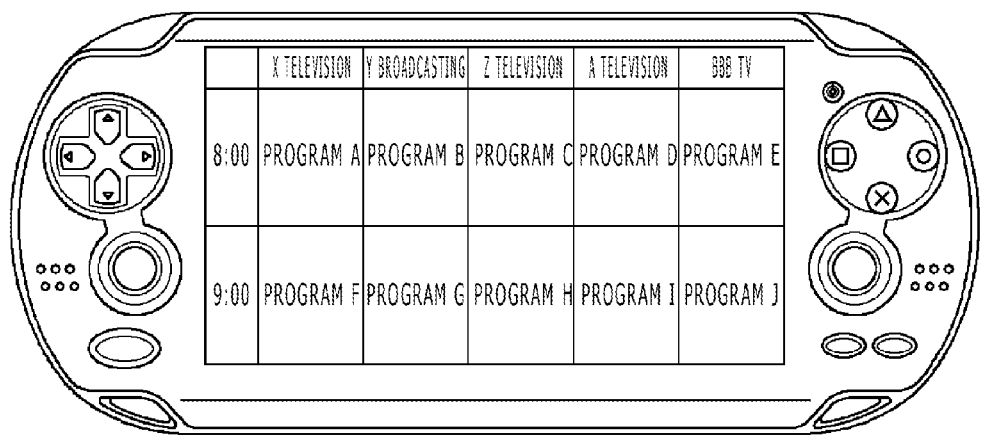
(b) 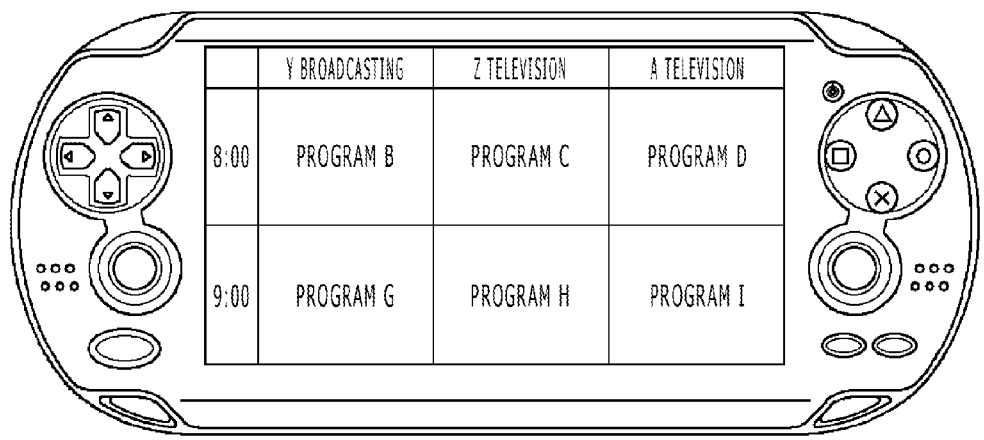
(c) 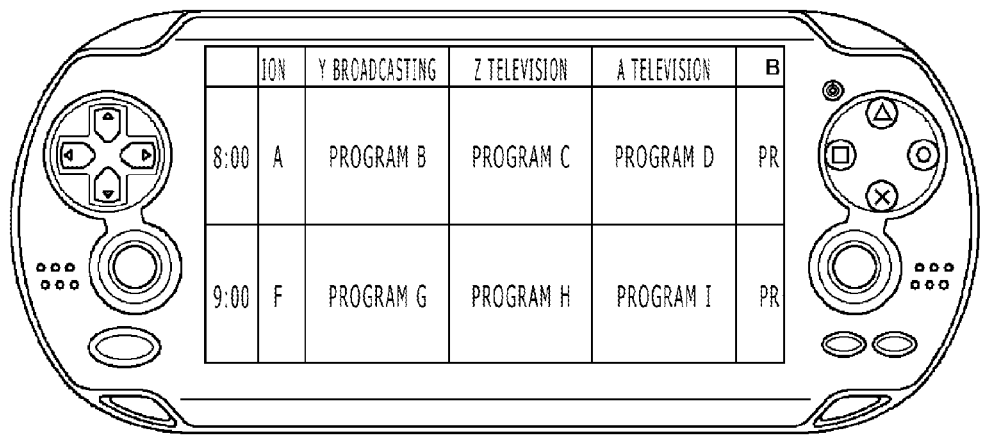

ELECTRONIC APPARATUS AND MENU DISPLAYING METHOD

TECHNICAL FIELD

The present invention relates to an electronic apparatus and a menu displaying method.

BACKGROUND ART

Electronic apparatus such as a portable game machine or a PDA (Personal Digital Assistant) are widespread. Many electronic apparatus incorporate a communication function, and also a multi-functional electronic apparatus which incorporates functions of a portable telephone set, a PDA and so forth like a smartphone has appeared. Such electronic apparatus include also an electronic apparatus which provides a user interface which allows a user to carry out a touch operation with a touch panel in addition to a conventional operation through an input of an operation button.

When a touch operation with a touch panel is carried out, a user interface wherein, when a user touches a content image displayed, for example, as a thumbnail image by a finger, the content image is displayed over an overall area of the panel or another user face wherein, when a user traces the surface of the panel with a finger, a display image is scrolled are generally applicable. Further, in recent years, also an electronic apparatus which includes a multi-touch screen having a detection function of a plurality of points touched at the same time has appeared. Also a user interface for implementing an operation of an electronic apparatus by a pinching operation of a user has been placed into practical use.

SUMMARY

Technical Problem

In an electronic apparatus which includes user interfaces of both of an operation button and a touch panel, it is convenient if an operation of the electronic apparatus can be executed whichever one of the user interfaces is used. On the other hand, the operation button and the touch panel are user interfaces different from each other. Therefore, between a case in which a user operates the electronic apparatus through an input of the operation button and another case in which the user operates the electronic apparatus through an input of the touch panel, the operation feeling which the user has is different. In some cases, the user may have a sense of discomfort.

Therefore, it is an object of the present invention to provide an improved technology for a user interface when both of an operation through an operation button and an operation through a touch panel are available.

Solution to Problem

In order to solve the problem described above, according to an aspect of the present invention, there is provided an electronic apparatus including an operation button configured to carry out an operation of the electronic apparatus through a key input, a touch panel configured to carry out an operation of the electronic apparatus through a touch operation, and a display controlling unit configured to display, in response to the operation of at least one of the operation button and the touch panel, a menu including at least one choice relating to the operation of the electronic apparatus on a display device. Here, the display controlling unit displays a menu to be displayed in response to the operation of the operation button and a menu to be displayed in response to the operation of the touch panel such that the menus include at least one common choice and besides the common choice is disposed in layouts different from each other.

According to another aspect of the present invention, there is provided a menu displaying method for being executed by a processor of an electronic apparatus. This method includes a step of displaying, in response to an operation of an operation button which carries out an operation of the electronic apparatus through a key input, a menu including at least one choice relating to an operation of the electronic apparatus on a display device, and a step of displaying, in response to an operation of a touch panel which carries out an operation of the electronic apparatus through a touch operation, a menu including at least one choice relating to an operation of the electronic apparatus on the display device. The menu displayed in response to an operation of the operation button and the menu displayed using the touch operation include at least one common choice such that the common choice is disposed in layouts different from each other on the menus.

Also a further aspect of the present invention is directed to an electronic apparatus. This electronic apparatus includes an operation button configured to carry out an operation of the electronic apparatus through a key input, a touch panel configured to carry out an operation of the electronic apparatus through a touch operation, and a display controlling unit configured to display a tap acceptance icon which responds to a touch operation on the touch panel which continues for a period of time shorter than a tap acceptance time period determined for the determination of whether a touch operation on the touch panel is a tap operation or a press operation depending upon a duration of the touch operation and a press acceptance icon which responds to a touch operation on the touch panel which continues for a period of time equal to or longer than the tap acceptance time period on a display device such that the icons at least partly overlap with each other.

It is to be noted that also arbitrary combinations of the constituent elements described above and the representations of the present invention obtained by conversion thereof between a method, an apparatus, a system, a recording medium, a computer program and so forth are effective as modes of the present invention.

Advantageous Effect of Invention

With the present invention, a suitable user interface for an electronic apparatus which can be operated by both of an operation button and a touch panel can be provided.

BRIEF DESCRIPTION OF DRAWINGS

FIG. 1(a) is a view depicting a front face of an electronic apparatus, and (FIG. 1b) is a view depicting a rear face of the electronic apparatus.

FIG. 2(a) is a view depicting an upper face of the electronic apparatus, FIG. 2(b) is a view depicting a lower face of the electronic apparatus, and FIG. 2(c) is a view depicting a left side face of the electronic apparatus.

FIGS. 5(*a*) to 5(*c*) are views depicting examples of a program guide displayed by a display controlling unit according to an embodiment.

DESCRIPTION OF EMBODIMENT

Figure 3:
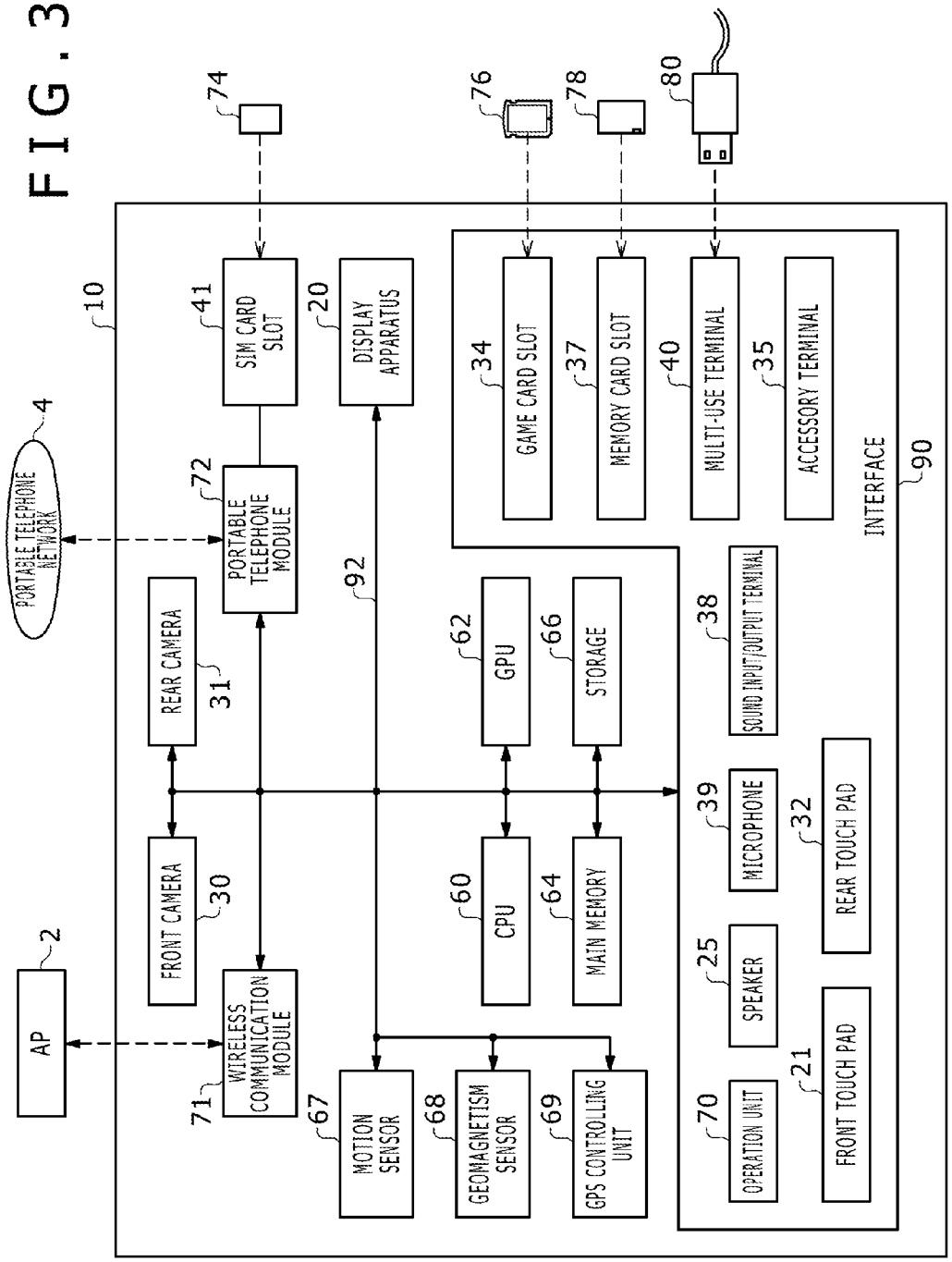
FIG. 3 is a view depicting a circuit configuration of the electronic apparatus.

An electronic apparatus according to an embodiment of the present invention is an information terminal apparatus having an operation button and a touch panel as a user interface for a user to operate the electronic apparatus. The electronic apparatus is, for example, a portable game machine or a smartphone. When the power supply to the electronic apparatus is made available, operating software for comprehensively controlling the electronic apparatus is executed. Thus, the electronic apparatus can execute various application programs such as a program for a game or image processing and a client application of a NAS (Network Attached Storage) including a television tuner.

In the following, an appearance configuration and a circuit configuration of the electronic apparatus according to the embodiment of the present invention are described. Although the electronic apparatus described below is a game machine of the portable type, it may otherwise be a portable terminal apparatus of a different type or may be a terminal apparatus of the installation type or a controller for such a terminal apparatus.

Configuration of the Front Face Portion

FIG. 1(*a*) depicts a front face of an electronic apparatus 10. The electronic apparatus 10 is formed from a horizontally elongated housing, and left and right regions of the electronic apparatus 10 which are grasped by a user have an arcuate contour. A rectangular touch panel 50 is provided on the front face of the electronic apparatus 10. The touch panel 50 is configured from a display apparatus 20, and a transparent front touch pad 21 which covers the surface of the display apparatus 20. The display apparatus 20 is an organic EL (Electro-Liminescence) panel and has a screen aspect ratio of 16:9 to display an image. It is to be noted that the display apparatus 20 may be display means such as a liquid crystal panel. The front touch pad 21 is a multi-touch pad having a detection function of a plurality of points touched at the same time, and the touch panel 50 is configured as a multi-touch screen.

On the right side of the touch panel 50, a triangle button 22*a*, a circle button 22*b*, a cross button 22*c* and a square button 22*d* (where they are hereinafter referred to, they are collectively called "operation buttons 22") are provided. The buttons 22 are located at the respective vertices of a rhombus. On the left side of the touch panel 50, an up key 23*a*, a left key 23*b*, a down key 23*c* and a right key 23*d* (where they are hereinafter referred to, they are collectively called "direction keys 23") are provided. The user can operate the direction keys to input eight directions of upward, downward, leftward, rightward and oblique directions. A left stick 24*a* is provided on the lower side of the direction keys 23, and a right stick 24*b* is provided on the lower side of the operation buttons 22. The user would tilt the left stick 24*a* or the right stick 24*b* (where they are hereinafter referred to, they are collectively called "analog sticks 24") to input a direction and a tilt amount. At left and right top portions of the housing, an L button 26*a* and an R button 26*b* are provided. The operation buttons 22, direction keys 23, analog sticks 24, L button 26*a* and R button 26*b* configure operation means for being operated by the user.

A front camera 30 is provided in the proximity of the operation buttons 22. On the left side of the left stick 24*a* and the right side of the right stick 24*b*, a left speaker 25*a* and a right speaker 25*b* (where they are hereinafter referred to, they are collectively called "speakers 25") for outputting sound are provided, respectively. A HOME button 27 is provided on the lower side of the left stick 24*a*, and a START button 28 and a SELECT button 29 are provided on the lower side of the right stick 24*b*.

Configuration of the Rear Face Portion

FIG. 1(*b*) depicts a rear face of the electronic apparatus 10. On the rear face of the electronic apparatus 10, a rear camera 31 and a rear touch pad 32 are provided. The rear touch pad 32 is configured as a multi-touch pad similarly to the front touch pad 21. The electronic apparatus 10 incorporates two cameras and touch pads on the front face and the rear face thereof.

Configuration of the Upper Face Portion

FIG. 2(*a*) depicts an upper face of the electronic apparatus 10. As described hereinabove, the L button 26*a* and the R button 26*b* are provided on the left and right end sides of the upper face of the electronic apparatus 10, respectively. A power supply button 33 is provided on the right side of the L button 26*a* such that the user turns on or off the power supply by depressing the power supply button 33. It is to be noted that the electronic apparatus 10 has a power controlling function of transiting into a suspend state if the period of time (no-operation time period) within which no operation means is operated continues for a predetermined period of time. If the electronic apparatus 10 enters the suspend state, then the user can place the electronic apparatus 10 from the suspend state into an awake state by depressing the power supply button 33.

A game card slot 34 is an insertion port into which a game card is to be inserted, and in FIG. 2(*a*), a state in which the game card slot 34 is covered with a slot cover is illustrated. It is to be noted that an LED lamp which blinks when the game card is accessed may be provided in the proximity of the game card slot 34. An accessory terminal 35 is a terminal for connecting a peripheral apparatus (accessory), and in FIG. 2(*a*), a state in which the accessory terminal 35 is covered with a terminal cover is illustrated. Between the accessory terminal 35 and the R button 26*b*, a minus button 36*a* and a plus button 36*b* for adjusting the volume are provided.

Configuration of the Lower Face Portion

FIG. 2(*b*) depicts a lower face of the electronic apparatus 10. A memory card slot 37 is an insertion port into which a memory card is to be inserted, and in FIG. 2(*b*), a state in which the memory card slot 37 is covered with a slot cover is illustrated. On the lower face of the electronic apparatus 10, a sound input/output terminal 38, a microphone 39 and a multi-use terminal 40 are provided. The multi-use terminal 40 is compatible with the USB (Universal Serial Bus) and can be connected to a different apparatus through a USB cable.

Configuration of the Left Side Face Portion

FIG. 2(*c*) depicts a left side face of the electronic apparatus 10. On the left side face of the electronic apparatus 10, a SIM card slot 41 which is an insertion port for a SIM card is provided.

Circuit Configuration of the Electronic Apparatus

FIG. 3 depicts a circuit configuration of the electronic apparatus 10. Components of the electronic apparatus 10 are connected to each other by a bus 92. A wireless communication module 71 is configured from a wireless LAN module complying with the communication standard such as IEEE802.11b/g or the like and is connected to an external network via an AP2. It is to be noted that the wireless communication module 71 may have a communication function of the Bluetooth (registered trade mark) protocol. A portable telephone module 72 is compatible with a third generation digital portable telephone system complying with the IMT-2000 (International Mobile Telecommunication 2000) prescribed by the ITU (International Telecommunication Union) and is connected to a portable telephone network 4. Into the SIM card slot 41, a SIM card 74 in which a unique ID number for specifying a telephone number of a portable telephone is recorded is inserted. When the SIM card 74 is inserted into the SIM card slot 41, the portable telephone module 72 is placed into a communicatable state with the portable telephone network 4.

A CPU (Central Processing Unit) 60 executes a program or the like loaded in a main memory 64. A GPU (Graphics Processing Unit) 62 executes calculation necessary for image processing. The main memory 64 is configured from a RAM (Random Access Memory) or the like and stores programs, data and so forth to be used by the CPU 60. A storage 66 is configured from a NAND-type flash memory or the like and is used as a built-in type auxiliary storage apparatus. The display apparatus 20 outputs an image generated by the CPU 60 or the like.

A motion sensor 67 detects a movement of the electronic apparatus 10, and a geomagnetism sensor 68 detects geomagnetism in three-axis directions. A GPS controlling unit 69 receives signals from GPS satellites to calculate a current position. The front camera 30 and the rear camera 31 pick up an image and input image data. The front camera 30 and the rear camera 31 are configured from a CMOS image sensor (Complementary Metal Oxide Semiconductor Image Sensor).

In an interface 90, an operation unit 70 includes various operation means of the electronic apparatus 10 and particularly includes the operation buttons 22, direction keys 23, analog sticks 24, L button 26*a*, R button 26*b*, HOME button 27, START button 28, SELECT button 29, power supply button 33, minus button 36*a* and plus button 36*b*. The front touch pad 21 and the rear touch pad 32 are multi-touch pads, and the front touch pad 21 is disposed in an overlapping relationship on the surface of the display apparatus 20. The speaker 25 outputs sound generated by the functions of the electronic apparatus 10, and the microphone 39 inputs peripheral sound of the electronic apparatus 10. The sound input/output terminal 38 inputs stereo sound from external microphones and outputs stereo sound to an external headphone or the like.

Into the game card slot 34, a game card 76 in which a game file is recorded is inserted. The game card 76 has a recording region into which data can be written, and if it is inserted into the game card slot 34, then writing/reading out of data is carried out by a medium drive. Into the memory card slot 37, a memory card 78 is inserted. If the memory card 78 is inserted into the memory card slot 37, then it is utilized as an auxiliary storage apparatus of the externally attached type. The multi-use terminal 40 can be utilized as a USB terminal, and if a USB cable 80 is connected to the multi-use terminal 40, then the multi-use terminal 40 carries out transmission/reception of data to/from a different USB apparatus.

Fusion of Button Operation and Touch Operation

Figure 4:
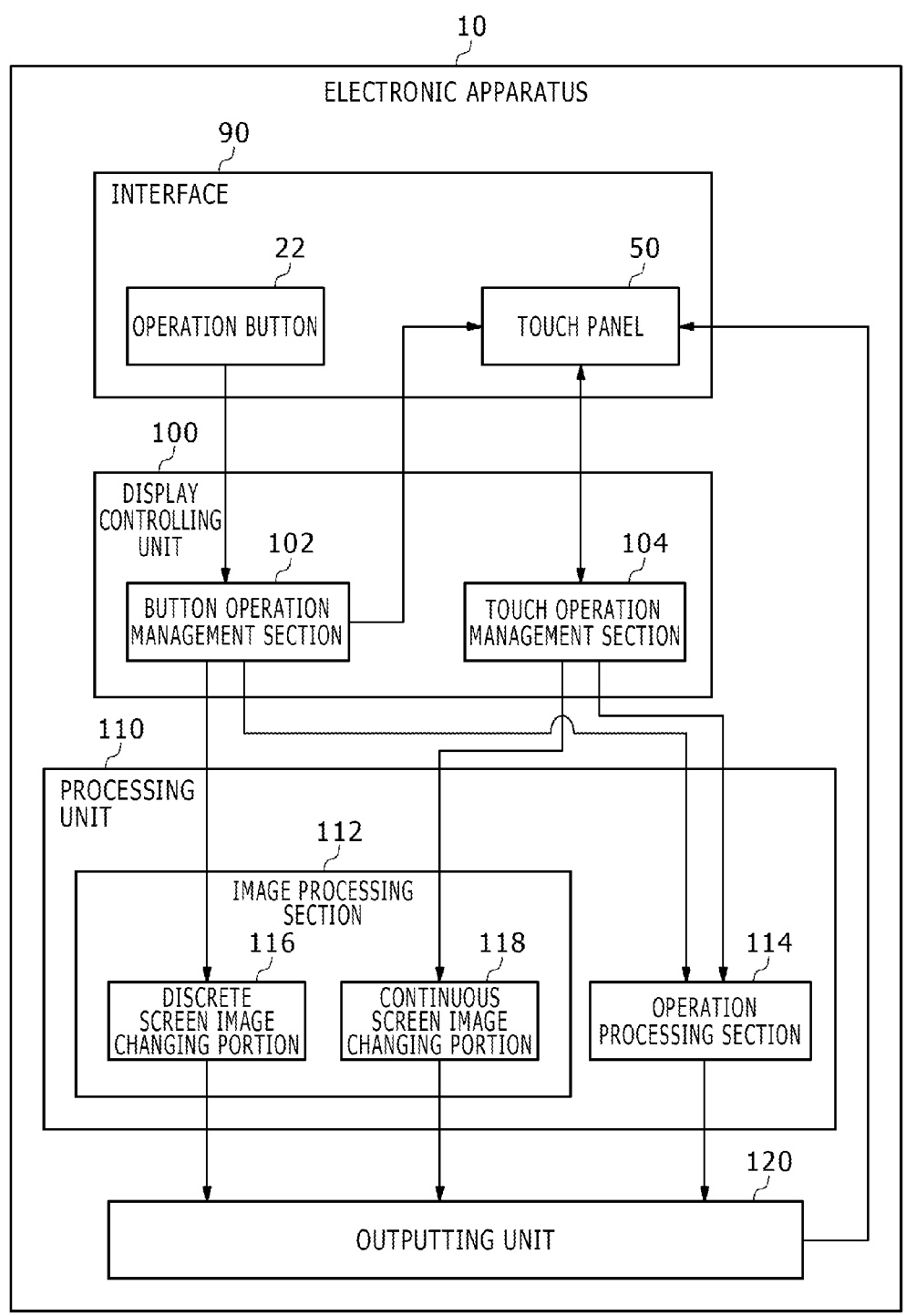
FIG. 4 is a view depicting functional blocks of the electronic apparatus.

FIG. 4 depicts functional blocks of the electronic apparatus 10 according to the embodiment of the present invention. The electronic apparatus 10 includes the interface 90, a display controlling unit 100, a processing unit 110, and an outputting unit 120. Such components as just described can be implemented, where they are configured from hardware components, from a CPU and a memory of an arbitrary computer, a program loaded in the memory and so forth. However, in FIG. 4, functional blocks implemented by cooperation of the components are depicted. Accordingly, it can be recognized by those skilled in the art that the functional blocks can be implemented in various forms only from hardware, only from software, or from a combination of software and hardware.

As described hereinabove, the interface 90 includes the operation buttons 22 and the touch panel 50. It is to be noted that, although only an operation button 22 is depicted as an interface for operating the electronic apparatus 10 through a key input in FIG. 4, the key inputting operation is not limited to this, but may be carried out through the direction keys 23, analog sticks 24, L button 26*a*, R button 26*b*, HOME button 27, START button 28, SELECT button 29, power supply button 33, minus button 36*a* and plus button 36*b*. Although, in the following description, in most cases in the present specification, the operation button 22 is taken as an example of an interface for a key inputting operation, the key operation may be inputted by an operation of any other button.

As described hereinabove, the touch panel 50 is configured from the display apparatus 20 and the transparent front touch pad 21 which covers the surface of the display apparatus 20. Therefore, the touch panel 50 is a display area of an execution screen image of the electronic apparatus 10 and is an interface for operating the electronic apparatus 10 through a touch operation. Here, the "operation of the electronic apparatus 10" includes, for example, an operation for a control menu for operating software for comprehensively controlling the electronic apparatus 10 and an operation for application software to be executed by the electronic apparatus 10. As an operation of application software, for example, also an operation of a character which is an operation target in a game application is included.

In this manner, the electronic apparatus 10 has, as a user interface for implementing an operation of the electronic apparatus 10, at least two interfaces different from each other including a key input of the operation button 22 and a touch operation of the touch panel 50. It is to be noted that, as described hereinabove, the electronic apparatus 10 according to the embodiment includes the rear touch pad 32. Although, in the following description, a touch operation is described principally in regard to an operation of the touch panel 50, the touch operation in the present embodiment includes also an operation of the rear touch pad 32.

The display controlling unit 100 executes an operation for the electronic apparatus 10 on the touch panel 50 in response to an operation of at least one of the operation button and the touch panel 50. As a particular example of an operation for the electronic apparatus 10, the display controlling unit 100 displays an operation menu relating to operations for the electronic apparatus 10. To this end, the display controlling unit 100 includes a button operation management section 102 and a touch operation management section 104. The "operation menu" may be any menu if the menu is executed by the electronic apparatus 10 such that the user can carry out selection on the touch panel 50 such as, for example, a setting menu of the operating software described hereinabove, a program guide or a playback list in an application for viewing a television broadcast or a recorded video program or a selection menu in a game application.

The button operation management section 102 displays an operation menu and so forth for the electronic apparatus 10 in response to an operation through the operation button 22. In contrast, the touch operation management section 104 associates a predetermined position on the touch panel 50 with the operation button 22. When a touch operation for the predetermined position on the touch panel 50 is carried out, the touch operation management section 104 displays a menu corresponding to an operation of the operation button 22 associated with the predetermined position.

The processing unit 110 executes an operation of the electronic apparatus 10 based on an operation of at least one of the operation button 22 and the touch panel 50. To this end, the processing unit 110 includes an image processing section 112 and an operation processing section 114.

When selection from an operation menu presented for selection on the touch panel 50 is carried out, the operation processing section 114 executes an operation for the electronic apparatus 10 associated with the selection. For example, where the operation menu is a program guide in an application for viewing a television broadcast or a recorded video program, television programs are displayed in a list on the touch panel 50.

FIGS. 5(a) to 5(c) are views depicting examples of a program guide displayed by the display controlling unit 100 according to the embodiment. More particularly, FIGS. 5(a) to 5(c) are program guides in which programs in time zones of television stations are disposed and in which the axis of abscissa indicates television stations and the axis of ordinate indicates broadcasting time zones. Here, FIG. 5(a) depicts a layout where a program guide of five television stations is displayed. Meanwhile, FIG. 5(b) depicts a layout where only three stations are displayed from among the five television stations of the displayed program guide. FIG. 5(c) depicts a layout halfway of transition from the program guide depicted in FIG. 5(a) to the program guide depicted in FIG. 5(b). Here, the number of television stations depicted in FIG. 5(b) is smaller than the number of television stations depicted in FIG. 5(a). Therefore, the program guide depicted in FIG. 5(b) is displayed on the touch panel 50 such that the display substance of characters, images and so forth in the table are enlarged in comparison with the program guide depicted in FIG. 5(a).

FIGS. 5(a) to 5(c) depict examples wherein a program guide of five television stations or three television stations and so forth are displayed. However, the number of television stations to be displayed is not limited to them, and it is possible to freely change the number by through operation of the operation button 22 or the touch panel 50. Further, while FIGS. 5(a) to 5(c) depict program guides for two hours from the 8:00 time zone to the 9:00 time zone, the time zone to be displayed may be longer or shorter than two hours. The user can change the time zone or the television stations to be displayed by operating the operation button 22 or swiping upwardly, downwardly, leftwardly, or rightwardly on the touch panel.

The user would select a desired television program from among programs displayed in a list on the touch panel 50. For example, when a program is selected by an operation of the operation button 22, the user would operate a direction key 23, an analog stick 24 or the like to a focus region not depicted. This can be implemented by the button operation management section 102 moving the focus region in response to detection of an operation of the operation button 22. Further, the "focus region" is an interface representative of which position in the operation menu is selected, and can be implemented, for example, by displaying the region selected in the program guide through highlight display. The user can select a desired program by moving the focus region to the desired program and depressing the operation button 22 which designates determination. More particularly, for example, if the circle button 22b is registered as a button for designating determination and the button operation management section 102 acquires depression of the circle button 22b, then the operation processing section 114 executes an operation for program display. The outputting unit 120 outputs a result of the execution of the operation processing section 114 to the touch panel 50 so as to be displayed on the touch panel 50.

On the other hand, when the user is to select a program through a touch operation with the touch panel 50, the user would tap a desired program displayed on the touch panel 50. The touch operation management section 104 acquires the position on the touch panel 50 tapped by the user. After the touch operation management section 104 acquires the tapped position, the operation processing section 114 executes an operation for displaying the program displayed at the position. More particularly, if depression of the button for designating determination for the program displayed at the acquired position is detected, then the touch operation management section 104 transmits a signal similar to a signal transmitted from the button operation management section 102 to the operation processing section 114 to the operation processing section 114.

The processing unit 110 accepts an operation other than an operation which designates determination from the user through the display controlling unit 100. If the program guides depicted in FIGS. 5(a) to 5(c) are taken as an example, then the operation other than the operation which designates determination is, for example, an operation for changing the number of television stations to be displayed. The user can change the number of television stations to be displayed in a program guide by operating at least one of the operation buttons 22 or the touch panel 50. In order to implement this, the image processing section 112 in the processing unit 110 includes a discrete screen image changing portion 116 and a continuous screen image changing portion 118. In the following, description is given taking the program guides exemplified in FIGS. 5(a) to 5(c) as an execution screen image of the electronic apparatus 10.

The operation button 22 is an interface which uses an on or off operation of the button as an input thereto and basically accepts an input of two values. Therefore, the discrete screen image changing portion 116 changes, for each key input accepted by the operation button 22, the number of television stations to be displayed in a program guide, which is an execution screen image of the electronic apparatus 10, stepwise. More particularly, in the electronic apparatus 10 according to the present embodiment, the L button 26a described hereinabove is associated with an operation for decreasing the number of television stations and the R button 26b is associated with an operation for increasing the number of television stations.

It is assumed that the user depresses the L button 26a in a state in which a program guide of five television programs is displayed as depicted in FIG. 5(a). When the discrete screen image changing portion 116 acquires a notification of depression of the L button 26a from the button operation management section 102, it enlarges the program guide by an enlargement factor determined in advance in order to carry out change of the program guide from the program guide of five television stations to the program guide of three television stations depicted in FIG. 5(b). At this time, the discrete screen image changing portion 116 may carry out changeover of the displayed program guide from the program guide of five television stations to the program guide of three television stations simultaneously with depression of the L button 26a or may change over the program guide by successively changing the enlargement factor so that the program guide may smoothly transit until the program guide of three television stations is reached from the program guide of five television stations while an animation effect is provided. In any case, the number of television stations is changed stepwise for each one time button operation on the program guide to be finally reached by the change.

Similarly, if the R button 26b is depressed by the user in a state in which a program guide of three television stations is displayed as depicted in FIG. 5(b), then the discrete screen image changing portion 116 reduces the program guide by a reduction factor determined in advance in order to carry out change of the displayed program guide from a program guide of three television stations to a program guide of five television stations. If the user further depresses the R button 26b in the state in which the program guide of five television stations is displayed, then the discrete screen image changing portion 116 further reduces the program guide by a reduction factor determined in advance in order to change the displayed program guide from the program guide of the five television stations to a program guide (not depicted) of seven television stations. In this manner, the discrete screen image changing portion 116 according to the embodiment changes, every time the L button 26a or the R button 26b is depressed by the user, the number of television stations to be displayed in a program guide stepwise to three, five, seven, and nine. In short, the number of television stations in a layout of a program guide to which the discrete screen image changing portion 116 can change the number of television stations is one of three, five, seven, and nine.

On the other hand, the user can change the layout of a program guide by performing a pinch-in operation or a pinch-out operation for the touch panel 50. Here, the "pinch-in operation" is a behavior of carrying out an operation of touching the touch panel 50 with two fingers and moving the touched positions toward each other like a movement of grasping something. On the other hand, the "pinch-out operation" is a behavior of touching the touch panel 50 with two fingers and moving the touched points away from each other.

It is assumed that the user carries out a pinch-out operation on the touch panel 50. At this time, the continuous screen image changing portion 118 enlarges the program guide in response to the input amount of the touch operation accepted by the touch panel 50. More particularly, the continuous screen image changing portion 118 enlarges the program guide following up the input amount of a touch operation in response to the rate of change of the distance between the fingers on the touch panel 50 as an enlargement factor for the program guide. For example, if the user increases the distance between the fingers from 2 cm to 3 cm, then the continuous screen image changing portion 118 enlarges the program guide by an enlargement factor of 3 cm/2 cm=1.5 times. Similarly, if the user carries out a pinch-in operation on the touch panel 50, then the continuous screen image changing portion 118 reduces the program guide using the rate of change of the distance between the fingers as a reduction factor for the program guide.

In the examples depicted in FIG. 5, the user places the thumb of the right hand on a program G displayed at a place on the rather left from the center of a lower portion of the touch panel 50 in the layout of the program guide depicted in FIG. 5(a) and places the forefinger at the program D displayed at the rather right from the center of an upper portion of the screen to carry out a pinch-out operation. As a result, the layout of the program guide becomes such a layout as depicted in FIG. 5(b). In particular, the program G on which the thumb is placed is displayed at the left end of a lower portion of the screen, and the program D on which the forefinger is placed is displayed at a right end of an upper portion of the screen. In this manner, the continuous screen image changing portion 118 executes enlargement or reduction of the display screen image and changing of the layout based on the contact positions at a starting point of time of a pinch-in operation or a pinch-out operation. Further, if the user touches two places on the touch panel 50 with fingers thereof and besides carries out dragging without changing the distance between the fingers, then the continuous screen image changing portion 118 can displace the program guide following up the dragging movement in the dragging direction and display the program guide changing the time zone for display or the broadcasting stations to be displayed. In this case, the enlargement or reduction factor or the layout of the program guide does not change.

Here, the continuous screen image changing portion 118 enlarges or reduces the program guide following up the input amount of the touch operation while the user continues the touch operation. On the other hand, when the touch operation of the user ends, namely, when the fingers of the user are moved away from the touch panel 50, the continuous screen image changing portion 118 changes the screen image until the screen image comes into coincidence with a screen image to which the discrete screen image changing portion 116 can change the screen image stepwise without depending upon the distance between the fingers then. In other words, when the touch operation of the user ends, the continuous screen image changing portion 118 selects a number of television stations to be displayed in the program guide from among three, five, seven, and nine based on an enlargement or reduction factor which depends upon the distance between the fingers then.

For example, in order to change the displayed program guide from a program guide in which three television stations are displayed to another program guide in which five television stations are displayed, it is necessary for the continuous screen image changing portion 118 to reduce the program guide to ⅗=0.6 times. In this manner, the enlargement or reduction factor to be used for change of the number of television stations to be displayed in the program guide from one of three, five, seven, and nine to a different number of television stations can be determined by calculation in advance. Therefore, when a pitch-in operation or a pitch-out operation ends, the continuous screen image changing portion 118 uses, from among the enlargement factors for obtaining a screen image to which the discrete screen image changing portion 116 can change the screen image, an enlargement or reduction factor nearest to the enlargement or reduction factor then to enlarge or reduce the program guide.

Here, when the user is carrying out a pinch-in operation, it is estimated that the user wants to increase the number of television stations to be displayed by reducing the program guide. Therefore, when the pitch-in operation of the user ends, the continuous screen image changing portion 118 enlarges or reduces the program guide by a maximum enlargement or reduction factor which is equal to or lower than the enlargement or reduction factor then and besides with which a screen image to which the discrete screen image changing portion 116 can change the screen image is obtained. Similarly, when the user is carrying out a pinch-out operation, it is estimated that the user wants to decrease the number of television stations to be displayed by enlarging the program guide. Therefore, when the pitch-out operation of the user ends, the continuous screen image changing portion 118 enlarges or reduces the program guide by a minimum enlargement or reduction factor which is equal to or higher than the enlargement or reduction factor then and besides with which a screen image to which the discrete screen image changing portion can change the screen image is obtained. Consequently, the program guide displayed finally is positioned at the program guide to which the discrete screen image changing portion 116 can change the program guide and besides the intention of the user can be reflected.

In this manner, the continuous screen image changing portion 118 changes the execution screen image of the electronic apparatus 10 continuously following up the input amount of a touch operation accepted by the touch panel 50. Therefore, the continuous screen image changing portion 118 can change the execution screen image to a screen image which is reached by stepwise changing the number of television stations to be displayed in the program guide by the discrete screen image changing portion 116 through a single time touch operation. Consequently, different from the operation buttons 22, the property of the touch panel 50 that a continuous operation can be carried out thereon can be reflected on the change of the execution screen image of the electronic apparatus 10.

Alternatively, when the user carries out a pinch-in operation or a pinch-out operation, the continuous screen image changing portion 118 may change the layout stepwise irrespective of the input amount then. For example, if the user carries out a pinch-out operation even a little amount in a layout wherein five television stations are displayed as in FIG. 5(*a*), the layout may be changed to such a layout wherein three television stations are displayed as depicted in FIG. 5(*b*).

Anyway, when the user carries out a pinch-in operation or a pinch-out operation, it is estimated that the user wants to change the number of channels to be displayed in the program guide, namely, to change the substance of the program guide. Therefore, the continuous screen image changing portion 118 changes the display substance to be displayed in the program guide in response to carrying out of a pinch-in operation or a pinch-out operation. At least at this point of time, the program guide changing process to be executed by the continuous screen image changing portion 118 in response to a pinch-in operation or a pinch-out operation is different from a simple enlargement or reduction process.

Figure 6:
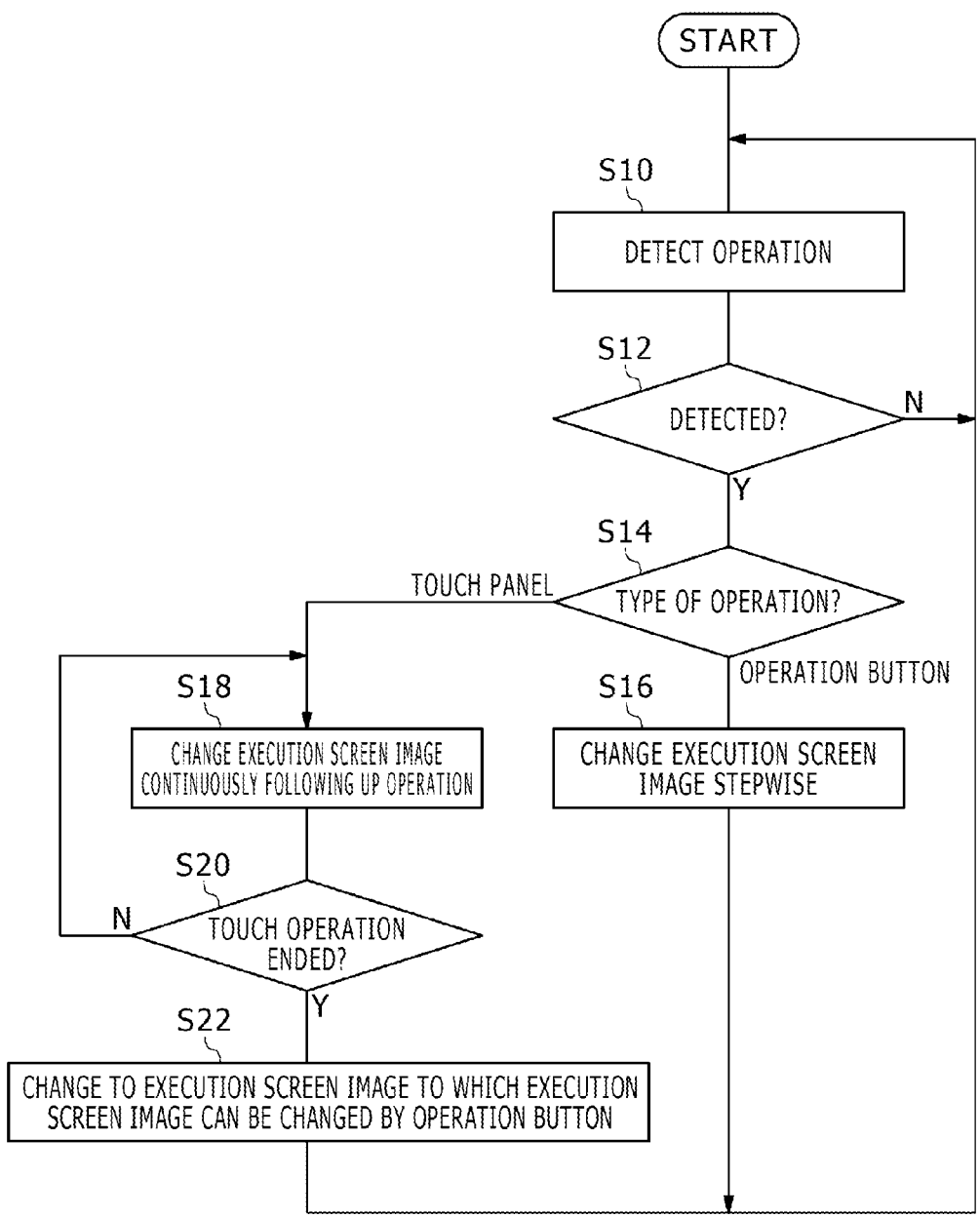
FIG. 6 is a flow chart illustrating a flow of an image display controlling process executed by the electronic apparatus according to the embodiment.

FIG. 6 is a flow chart illustrating a flow of an image display controlling process executed by the electronic apparatus 10 according to the embodiment. Processing in the flow chart is started, for example, when the power supply to the electronic apparatus 10 is made available.

The display controlling unit 100 detects an operation of an operation button 22 of the interface 90 or an operation of the touch panel 50 by a user (S10). While no operation is detected (N at S12), the display controlling unit 100 repeats detection of an operation of an operation button 22 or the touch panel 50 (S10).

If an operation of an operation button 22 or the touch panel 50 is detected (Y at S12), then the display controlling unit 100 acquires the type of the operation. If the type of the operation is an operation button (operation button at S14), then the discrete screen image changing portion 116 changes the execution screen image of the electronic apparatus 10 stepwise (S16). After the execution screen image is changed, the processing returns to step S10 to repeat the processes described above.

If the type of the operation is a touch operation (touch panel at S14), then the continuous screen image changing portion 118 continuously changes the execution screen image of the electronic apparatus 10 following up the touch operation (S18). While the touch operation by the user continues (N at S20), the continuous screen image changing portion 118 continues to continuously change the execution screen image of the electronic apparatus 10 following up the touch operation. If the touch operation by the user comes to an end (Y at S20), then the continuous screen image changing portion 118 changes the screen image until the screen image becomes coincident with a screen image to which the discrete screen image changing portion 116 can change the screen image stepwise (S22). After the execution screen image is changed, the processing returns to step S10 to repeat the processes described above.

GUI Displayed Using a Button Operation as a Trigger and GUI Displayed in response to a Touch Operation The principle in implementation of similar operation results in both of a case in which the execution screen image is changed by stepwise operation through a key input of an operation button 22 and another case in which the execution screen image is changed by a continuous operation on the touch panel 50 is described above. As described above, an operation button 22 is an interface to which the input is an on operation or an off operation of the button and basically accepts an input of two values. On the other hand, the touch operation with the touch panel 50 allows a continuous input and a touch operation with an arbitrary position on the touch panel 50. Accordingly, for a GUI (Graphical User Interface) which assumes an operation of an operation button 22 and another GUI which assumes a touch operation on the touch panel 50, it is preferable to provide GUIs suitable for the respective operations. Therefore, GUIs to be displayed in response to an operation of an operation button 22 and an operation on the touch panel 50 are described below.

Figure 7:
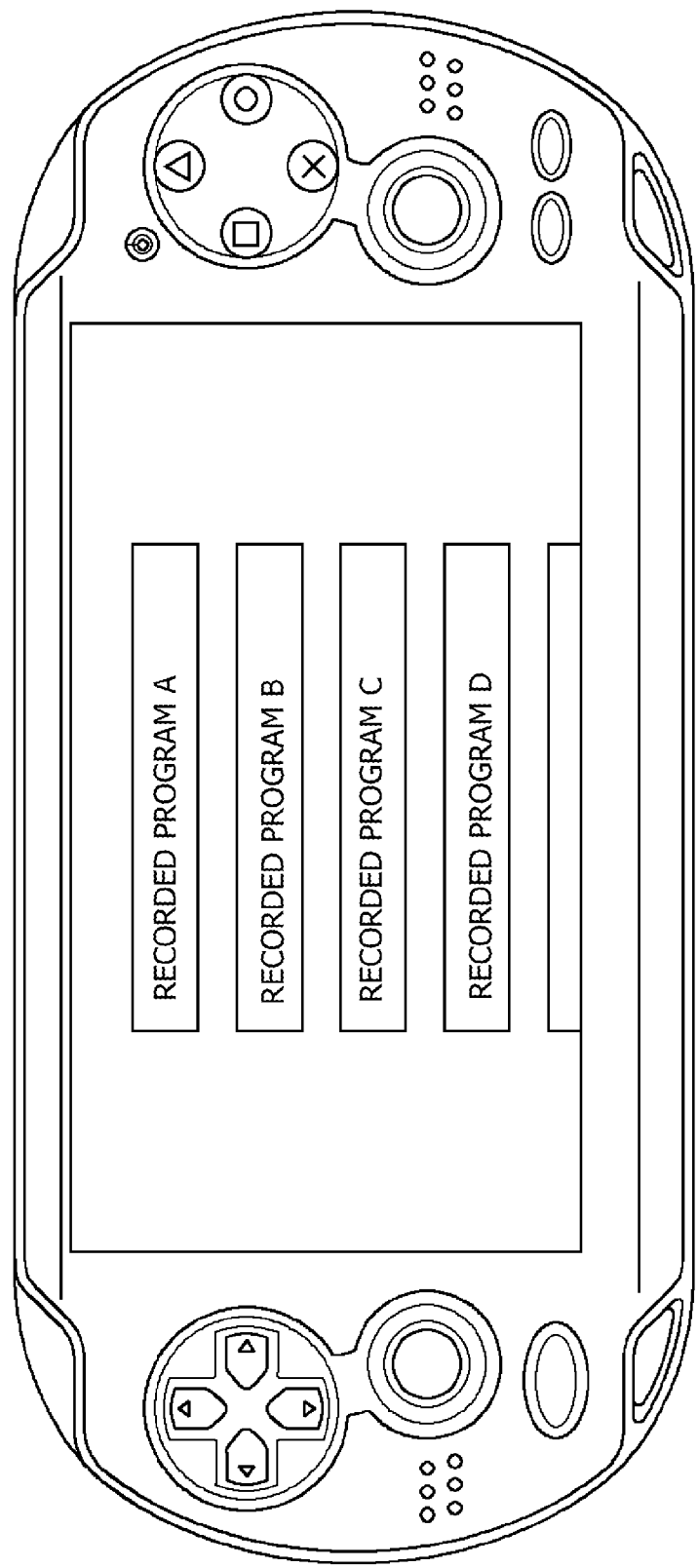
FIG. 7 is a view depicting an example of a list of recorded programs displayed by the display controlling unit according to the embodiment.

FIG. 7 is a view depicting an example of a list of recorded programs displayed by the display controlling unit 100 according to the invention. In the example depicted in FIG. 7, four recorded programs A, B, C, and D are depicted. The user can change the recorded programs displayed on the touch panel 50 by operating the operation buttons 22. This can be implemented by the button operation management section 102 changing the recorded program in response to detection of an operation of an operation button 22. Also it is possible for the user to change the recorded programs displayed on the touch panel 50 by carrying out flicking or swiping on the touch panel 50. This can be implemented by the touch operation management section 104 changing the recorded programs in response to detection of an operation of the touch panel 50. In this manner, the electronic apparatus 10 according to the embodiment is configured such that the functions can be implemented similarly not only in response to an operation of an operation button 22 but also in response to a touch operation on the touch panel 50.

Figure 8:
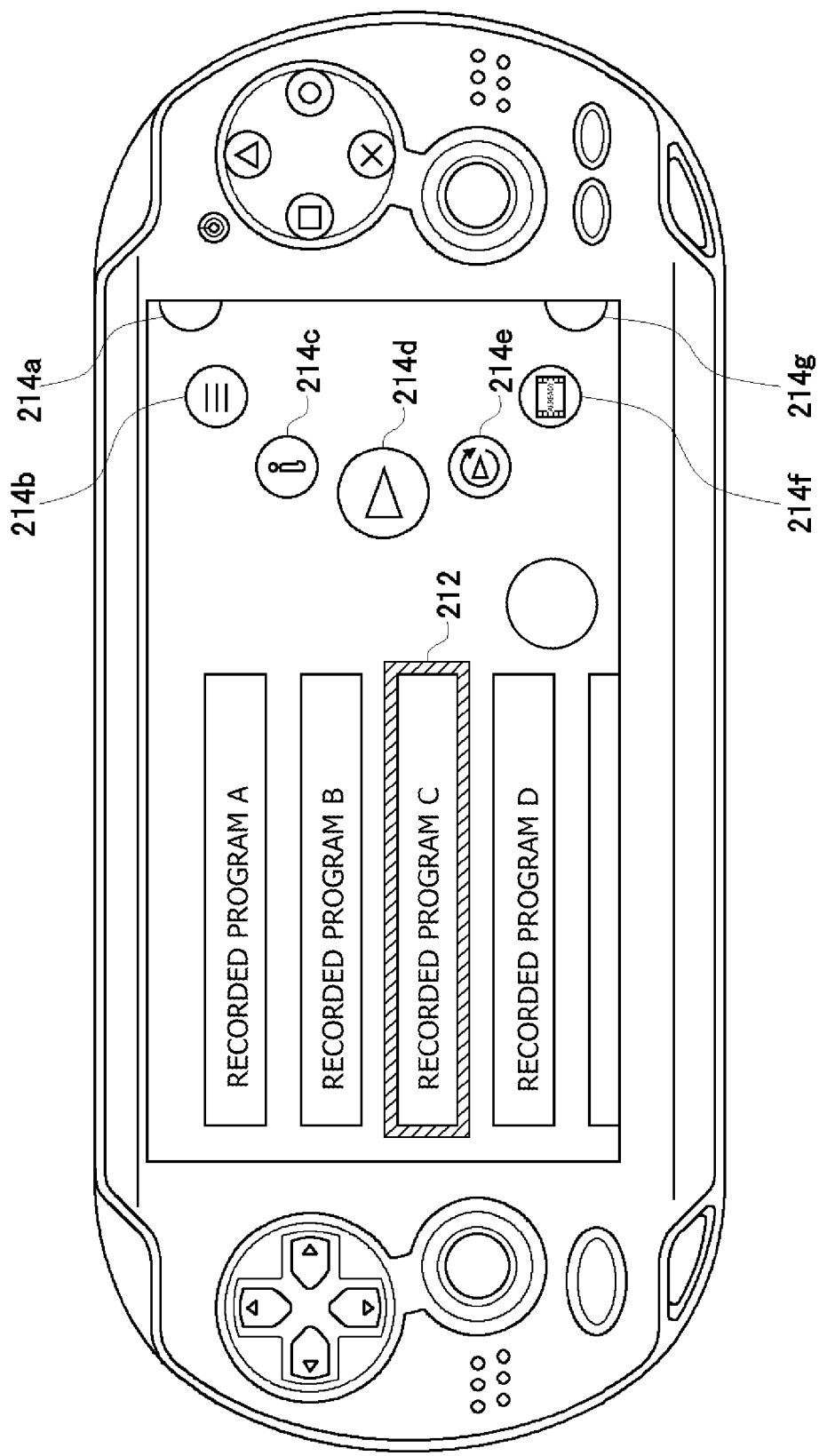
FIG. 8 is a view depicting an example of an operation menu displayed by a button operation management section according to the embodiment.

FIG. 8 is a view depicting an example of an operation menu displayed by the button operation management section 102 according to the embodiment. The user would operate an operation button 22 to move the focus region to place a desired recorded program within a list of recorded programs displayed on the touch panel 50 into a focus state. In FIG. 8, the recorded program placed in the focus state is the recorded program C, and this is indicated by a thick frame 212 denoted by slanting lines. However, the presentation method of the focus state is not limited to the example depicted in FIG. 8, but any method may be applied if the focus state is indicated by a mode by which the focus state can be identified from any other factor.

After the user places the desired recorded program into a focus state, the user would depress an operation button 22 for designating determination (for example, the circle button 22*b*) to select the recorded program. The button operation management section 102 displays an operation menu which assumes an operation of an operation button 22 in response to an operation of the operation button 22. In FIG. 8, a set of circular icons 214*a* to 214*g* disposed in a semicircular shape at the right end of the touch panel 50 is an operation menu displayed by the button operation management section 102. The icons included in the operation menu individually correspond to different operations of the electronic apparatus 10. In FIG. 8, whether or not an icon is in a focus state is represented by the size of the icon. More particularly, the icon 214*d* in a focus state is indicated as an icon greater than any other icon which is not in a focus state.

The user can change the icon in the focus state by operating an operation button 22, and can select the icon by depressing an operation button 22 which designates determination. This can be implemented by the button operation management section 102 changing the arrangement of icons as choices displayed on the touch panel 50 in response to a key input through the operation button 22. The operation associated with the selected icon is executed by the operation processing section 114.

In this manner, the operation menu displayed by the button operation management section 102 in response to an operation of an operation button 22 is configured assuming an operation of the operation button 22. In other words, a series of operations for changing an icon in a focus state, determination of the selected icon and so forth is designed so that they can be operated readily through the operation buttons 22.

Here, the user can change the arrangement of the circular icons 214*a* to 214*g* of the operation menu by carrying out flicking or swiping on the touch panel 50. For example, if the user carries out swiping of fingers along the proximity of the left side of the icon 214*d* in a focus state toward an upper portion of the touch panel 50 in FIG. 8, then the arrangement of the circular icons 214*a* to 214*g* rotates clockwise. Consequently, even if the user does not operate the operation buttons 22, it is possible to change the arrangement of the operation menu to display an icon which has not been displayed. Further, if the user directly taps an icon displayed on the touch panel 50, then even if the icon is not in a focus state, selection and determination of the icon can be ended by a single time action. This can be implemented by the touch operation management section 104 acquiring a tapped position on the touch panel 50 and causing an operation associated with the icon at the position to be executed by the operation processing section 114.

Figure 9:
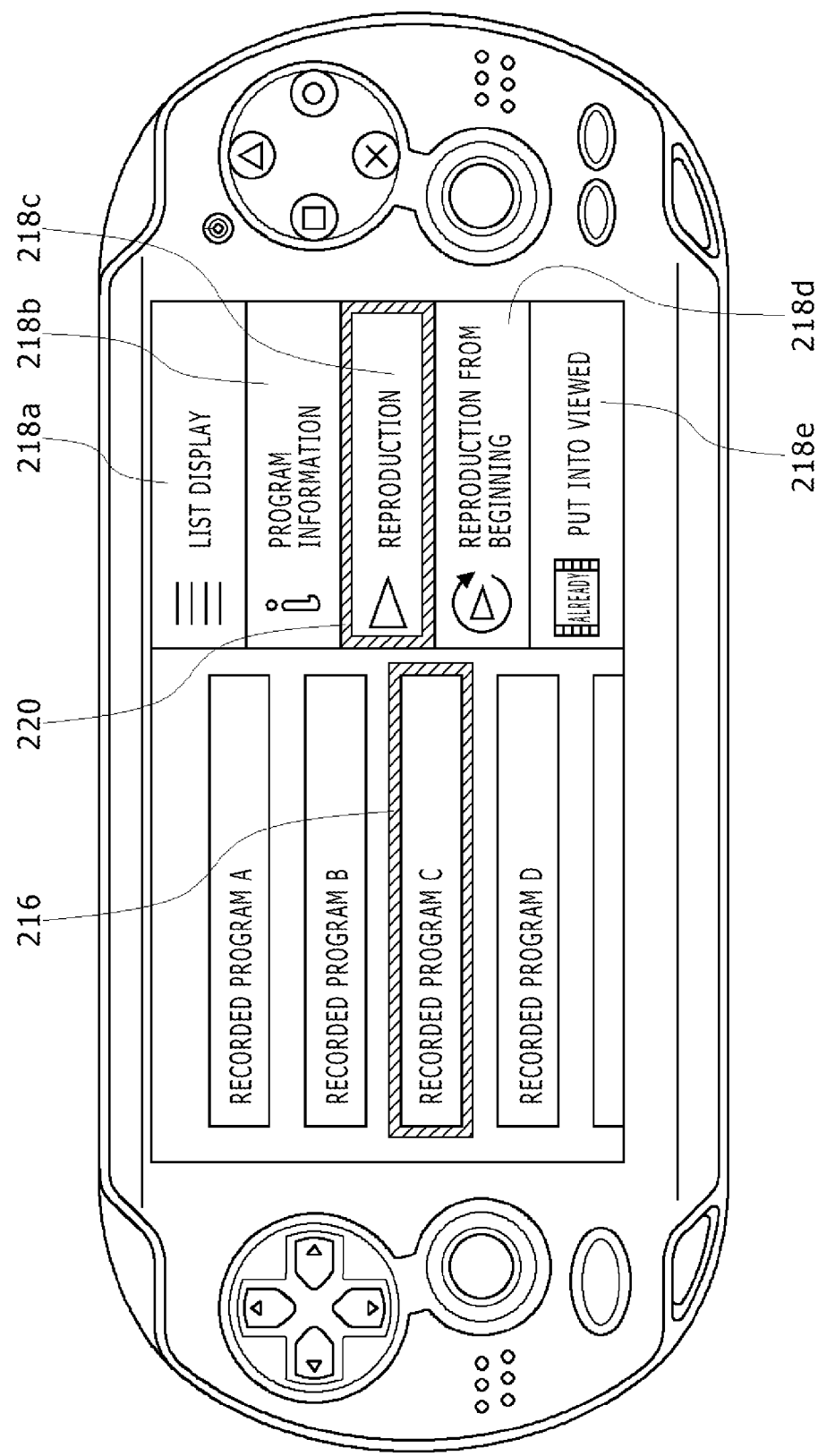
FIG. 9 is a view depicting an example of an operation menu displayed by a touch operation management section according to the embodiment.

FIG. 9 is a view depicting an example of an operation menu displayed by the touch operation management section 104 according to the embodiment. The user would directly tap a desired recorded program from within a list of recorded programs displayed on the touch panel 50 to select the recorded program. In FIG. 9, the selected recorded program is the recorded program C and is indicated by a thick frame 216 indicated by slanting lines.

The touch operation management section 104 displays an operation menu which assumes a touch operation of the touch panel 50 in response to selection of a recorded program through a touch operation from within a list of recorded program. In particular, the touch operation management section 104 associates a display position of each recorded program in the recorded program list displayed on the touch panel 50 and the operation button 22 for designating determination (for example, the circle button 22*b*) with each other. If a touch operation of the display position of any recorded program is detected, then the touch operation management section 104 executes a display of a menu or an operation corresponding to the operation of the operation button 22.

Here, the touch operation management section 104 may display an icon indicative of the operation button 22 which designates determination on the touch panel 50 in response to selection of a recorded program through a touch operation from within the list of recorded programs. This makes it possible to indicate, to a user who is familiar to an operation of an operation button 22, which operation is to be executed.

In FIG. 9, a set of rectangular icons and character strings 218*a* to 218*e* disposed like a list at the right end of the touch panel 50 is an operation menu. The icons and the character strings 218*a* to 218*e* included in the operation menu individually correspond to different operations of the electronic apparatus 10. By directly tapping any of the icons and the character strings 218*a* to 218*e* included in the operation menu displayed on the touch panel 50 by the touch operation management section 104, the user can execute an operation associated with the icon.

In this manner, an operation menu displayed by the touch operation management section 104 in response to a touch operation of the touch panel 50 is configured assuming an operation through a touch operation. Since the user can carry out a touch operation at an arbitrary position of the touch panel, the touch operation management section 104 displays icons and character strings which are more than one choice and can be selected discretely on the touch panel 50. The user can grasp the plurality of choices at a glance and can select one of the plural choices by a single time touch operation.

Here, it is assumed that, while the touch operation management section 104 displays an operation menu configured assuming an operation through a touch operation on the touch panel 50, the user operates one of the operation buttons 22. At this time, the button operation management section 102 may display a focal region on an operation menu configured assuming an operation through a touch operation in response to detection of an operation of an operation button 22. In FIG. 9, the focal region displayed by the button operation management section 102 is indicated by a thick frame 220 indicated by slanting lines. Once a focus region is displayed, the user can change the icon in the focus state by operating an operation button 22 and can select the icon by depressing the operation button 22 for designating determination. This can be implemented by the button operation management section 102 changing the arrangement of icons of choices displayed on the touch panel 50 in response to a key input through an operation button 22.

As exemplified in FIGS. 8 and 9, an operation menu displayed by the button operation management section 102 in response to an operation of an operation button 22 and an operation menu displayed by the touch operation management section 104 in response to a touch operation of the touch panel include at least one common choice. However, an operation menu displayed by the button operation management section 102 and an operation menu displayed by the touch operation management section 104 use layouts different from each other, in which the common choice or choices are disposed. Consequently, an operation menu of the electronic apparatus 10 can be displayed in a layout suitable for a type of an operation.

Meanwhile, the electronic apparatus 10 according to the embodiment is configured so that similar operations can be implemented irrespective of whether the operation is an operation of an operation button 22 or a touch operation of the touch panel 50. Accordingly, even with an operation menu called in response to an operation of an operation button 22, by tapping an icon displayed on the touch panel 50, the electronic apparatus 10 can execute an operation associated with the icon. Similarly, even with an operation menu called in response to a touch operation of the touch panel 50, by operating an operation button 22, the electronic apparatus 10 can move the focus region to carry out selection.

Figure 10:
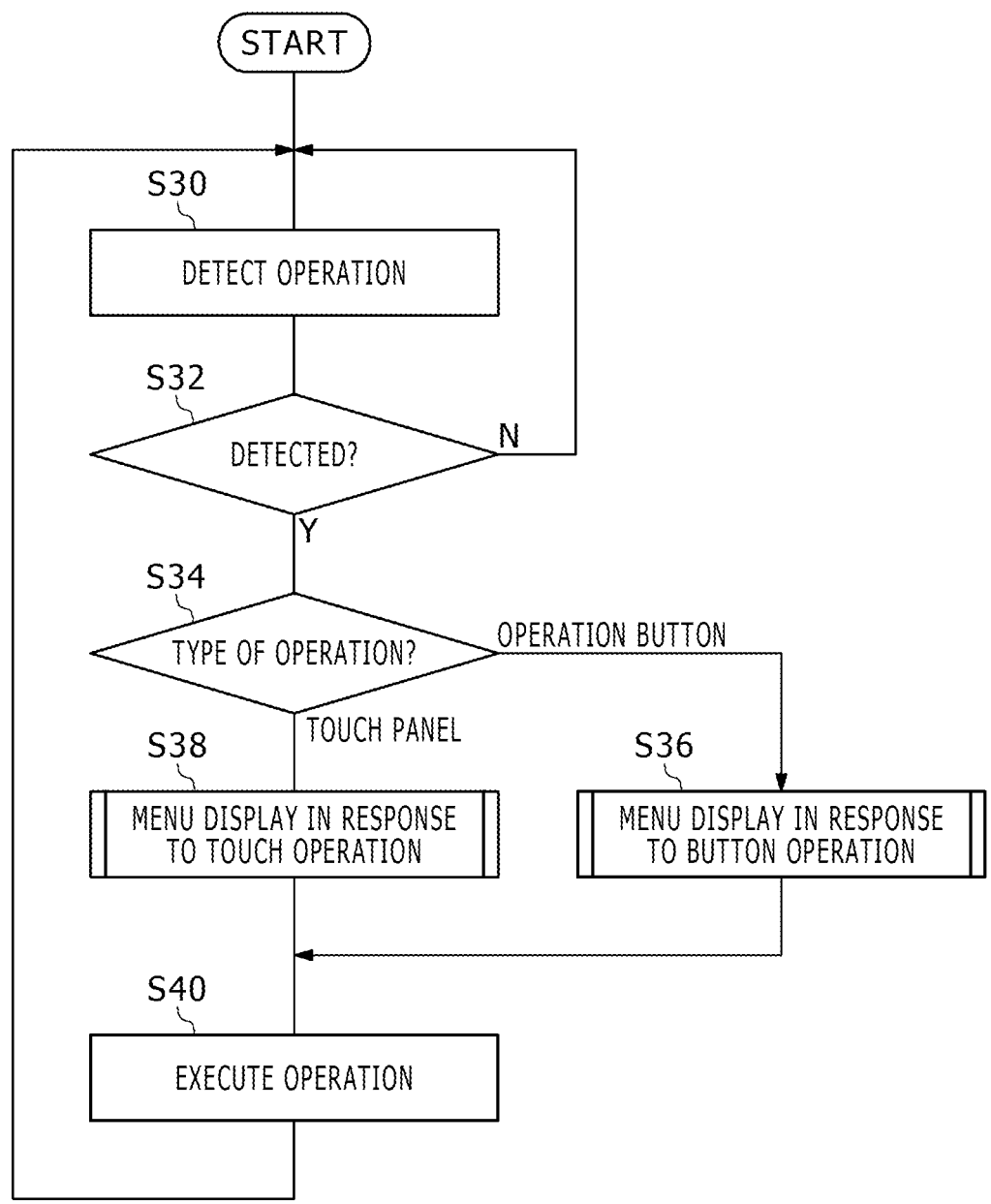
FIG. 10 is a flow chart illustrating a flow of a menu displaying process executed by the electronic apparatus according to the embodiment.

FIG. 10 is a flow chart illustrating a flow of a menu displaying process executed by the electronic apparatus 10 according to the embodiment. Processing according to the present flow chart is started, for example, when the power supply to the electronic apparatus 10 is made available.

The display controlling unit 100 detects an operation of an operation button 22 of the interface 90 or of the touch panel 50 by a user (S30). While no operation is detected (N at S32), the display controlling unit 100 repeats detection of an operation of the operation buttons 22 or the touch panel 50.

If an operation of an operation button 22 or the touch panel 50 is detected (Y at S32), then the display controlling unit 100 acquires a type of the operation. If the type of the operation is an operation button (operation button at S34), then the button operation management section 102 displays an operation menu in response to the button operation on the touch panel 50 (S36). If the type of the operation is a touch operation (touch panel at S34), then the touch operation management section 104 displays an operation menu in response to the touch operation on the touch panel 50 (S38). The operation processing section 114 executes an operation corresponding to a selected choice of the operation menu (S40). After the operation processing section 114 executes the operation, the processing returns to step S30 to repeat the processes described above.

Figure 11:
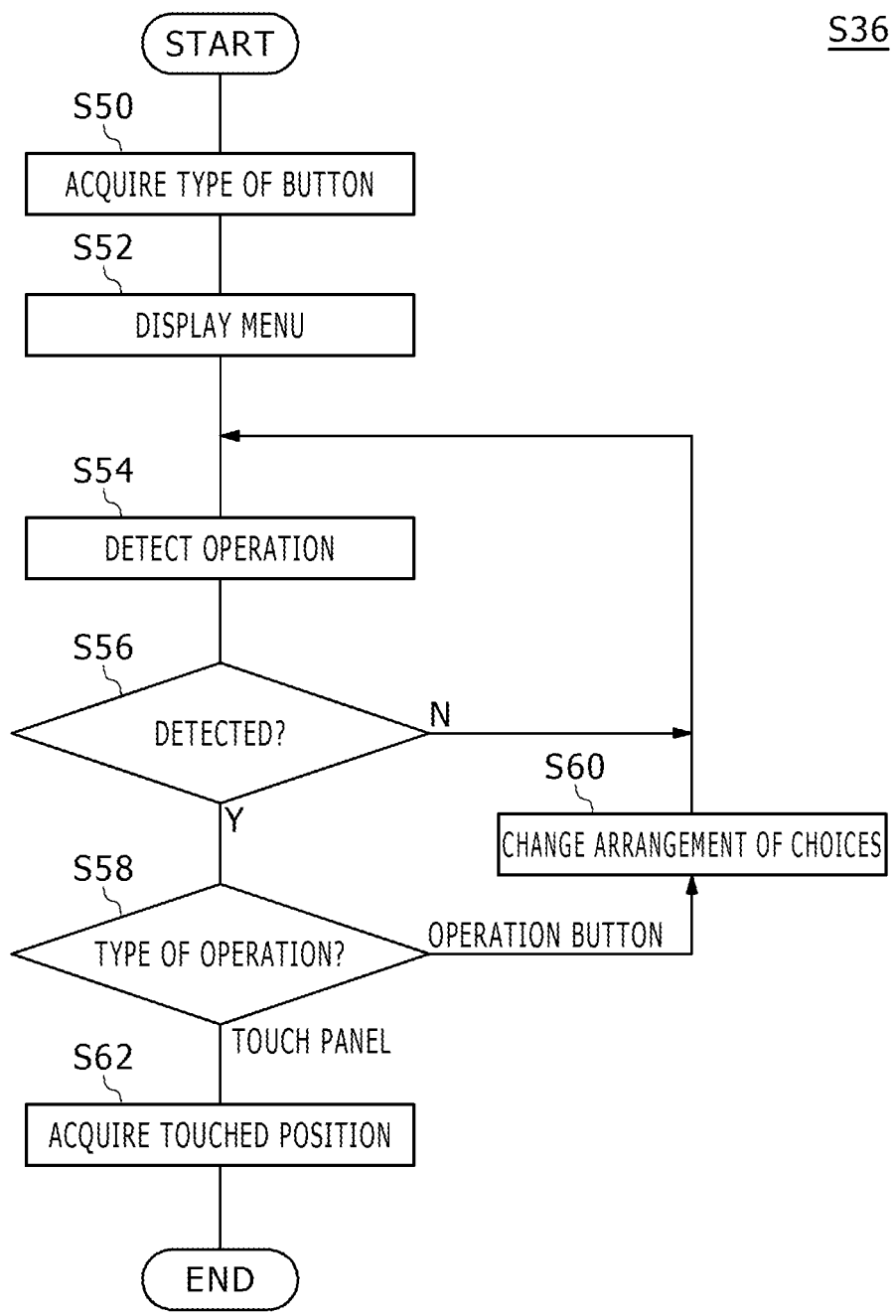
FIG. 11 is a flow chart illustrating a flow of the menu displaying process executed by the button operation management section according to the embodiment.

FIG. 11 is a flow chart illustrating a flow of the menu displaying process executed by the button operation management section 102 according to the embodiment and is a view illustrating the step S36 in FIG. 10 in detail.

The button operation management section 102 acquires a type of the operation button 22 depressed by the user (S50). The button operation management section 102 displays an operation menu corresponding to the acquired type of the operation button 22 on the touch panel 50 (S52). By associating different operation menus with the individual operation buttons in advance, various operation menus can be displayed by a single time depression action.

The display controlling unit 100 detects an operation of an operation button 22 of the interface 90 or of the touch panel by the user (S54). While no operation is detected (N at S56), the display controlling unit 100 returns the processing to step S54 to repeat the detection of an operation of an operation button 22 or the touch panel 50.

If an operation of an operation button 22 or the touch panel 50 is detected (Y at S56), then the display controlling unit 100 acquires a type of the operation. If the type of the operation is an operation button (operation button at S58), then the button operation management section 102 changes the arrangement of icons as choices displayed on the touch panel 50 (S60). If the type of the operation is a touch operation (touch panel at S58), then the touch operation management section 104 acquires a touch position on the touch panel 50 (S62). An operation associated with the icon displayed at the touch position is an operation selected by the user.

Figure 12:
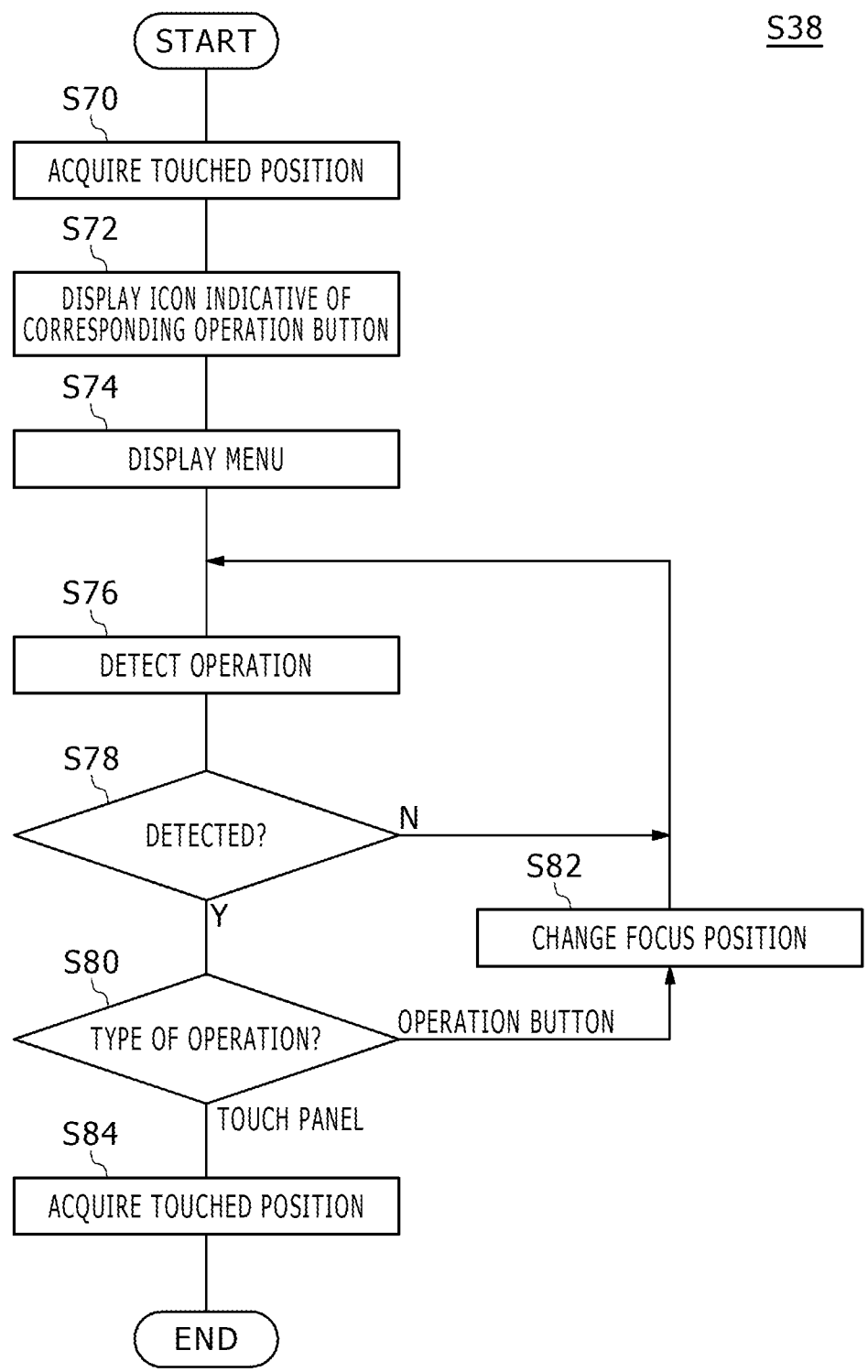
FIG. 12 is a flow chart illustrating a flow of the menu displaying process executed by the touch operation management section according to the embodiment.

FIG. 12 is a flow chart illustrating a flow of the menu displaying process executed by the touch operation management section 104 according to the embodiment and is a view illustrating the step S38 in FIG. 10 in detail.

The touch operation management section 104 acquires a position at which the user touches on the touch panel 50 (S70). The touch operation management section 104 acquires an icon indicative of an operation button 22 corresponding to the touched position (S72). The touch operation management section 104 further displays an operation menu in response to the touch operation (S74).

The display controlling unit 100 detects an operation of the operation button 22 of the interface 90 or of the touch panel 50 by the user (S76). While no operation is detected (N at S78), the display controlling unit 100 returns the processing to step S76 to repeat the detection of an operation of the operation button 22 or the touch panel 50.

If an operation of an operation button 22 or the touch panel 50 is detected (Y at S78), then the display controlling unit 100 acquires a type of the operation. If the type of operation is an operation button (operation button at S80), then the button operation management section 102 displays a focus region on the touch panel 50 or changes, when a focus region is displayed already, the focus position (S82). If the type of the operation is a touch operation (touch panel at S80), then the touch operation management section 104 acquires a touch position on the touch panel 50 (S80). An operation associated with the icon displayed at the touch position is an operation selected by the user.

GUI for a Touch Operation

The GUIs to be displayed in response to an operation of an operation button 22 and an operation of the touch panel 50 have been described above. Now, a GUI unique to a touch operation on the touch panel 50 is described.

Figure 13:
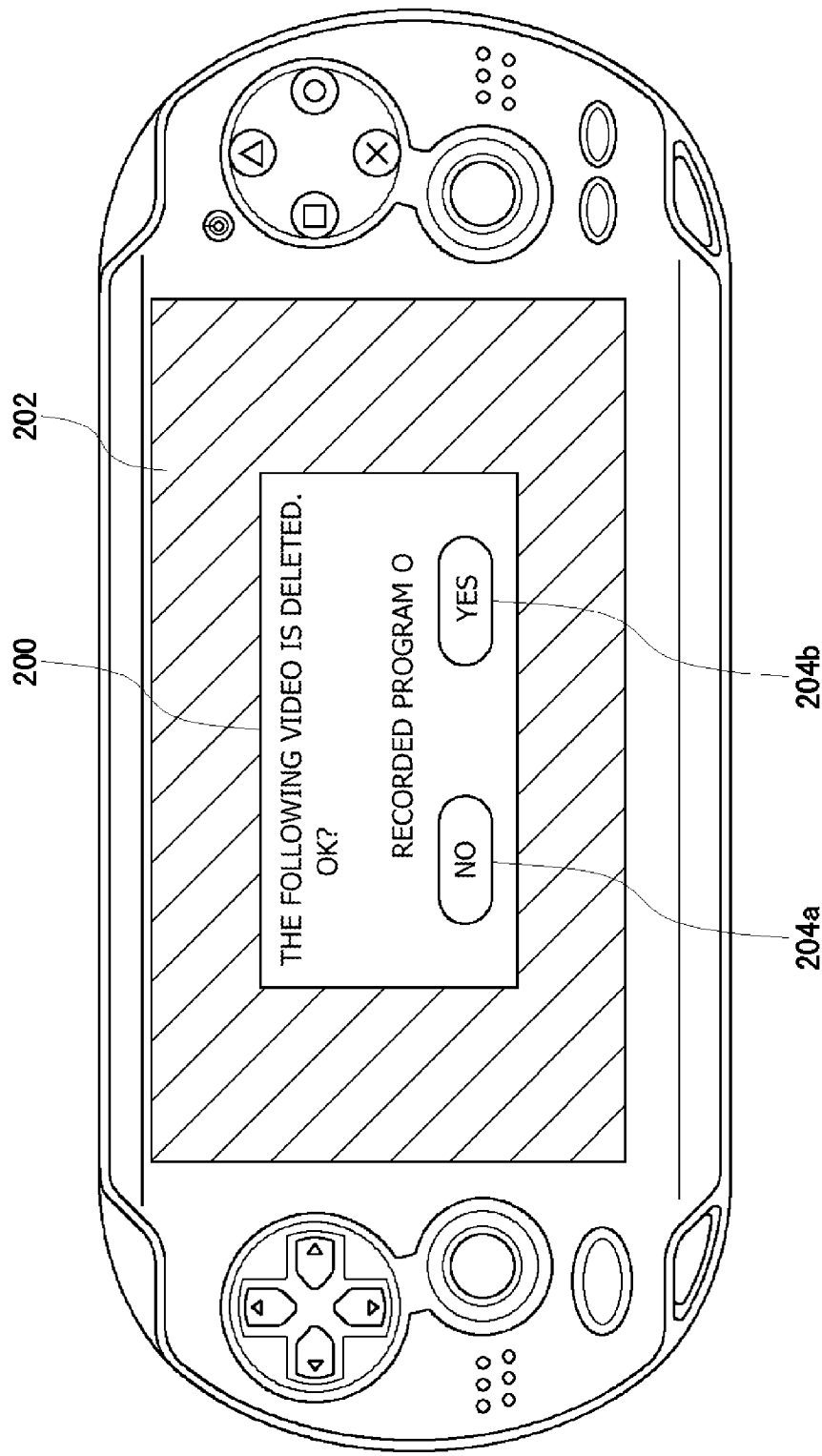
FIG. 13 is a view depicting an example of a graphical user interface displayed on the electronic apparatus according to the embodiment.

FIG. 13 is a view depicting an example of a GUI displayed on the electronic apparatus 10 according to the embodiment. The example depicted in FIG. 13 is an example indicating a confirmation screen image displayed on the touch panel 50 by the button operation management section 102 or the touch operation management section 104 when the user carries out an operation for deleting a recorded program O in the list of recorded programs depicted in FIG. 7. A screen image 200 for confirming whether or not deletion is to be carried out includes a "No" icon 204a for canceling a deletion operation and a "Yes" icon 204b for executing a deletion operation. The user can tap the icons to finally execute or cancel a deletion operation. It is to be noted that deletion of a recorded program is executed by the operation processing section 114 in accordance with an instruction from the user.

In the example depicted in FIG. 13, a portion of the touch panel 50 other than the screen image 200 for confirming presence or absence of deletion is indicated by a slanting line region 202. The user can cancel a deletion operation also if the user taps the slanting line region 202 in addition to an operation of tapping the "No" icon 204a. Here, since the screen image 200 for confirming presence or absence of deletion is a GUI for encouraging the confirmation to the user, it is, in other words, an active region. In contrast, the slanting line region 202 is an inactive region. In the electronic apparatus 10 according to the embodiment, the inactive region other than the active region displayed on the touch panel 50 is utilized as a cancel region for canceling an operation associated with the active region.

While, in the example depicted in FIG. 13, the inactive region is indicated by the slanting line region 202, for example, the displaying manner of the inactive region is not limited to slanting lines. In addition to this, any displaying manner may be applied only if it allows discrimination from an active region such as to carry out a low-pass filter process for the inactive region against the background to blur the inactive region, to lower the luminance, to rotate the hue, to gray, or to stop, when the background includes some movement, the movement. By utilizing the inactive region other than the active region as a cancel region, the user can easily cancel an operation.

Figure 14:
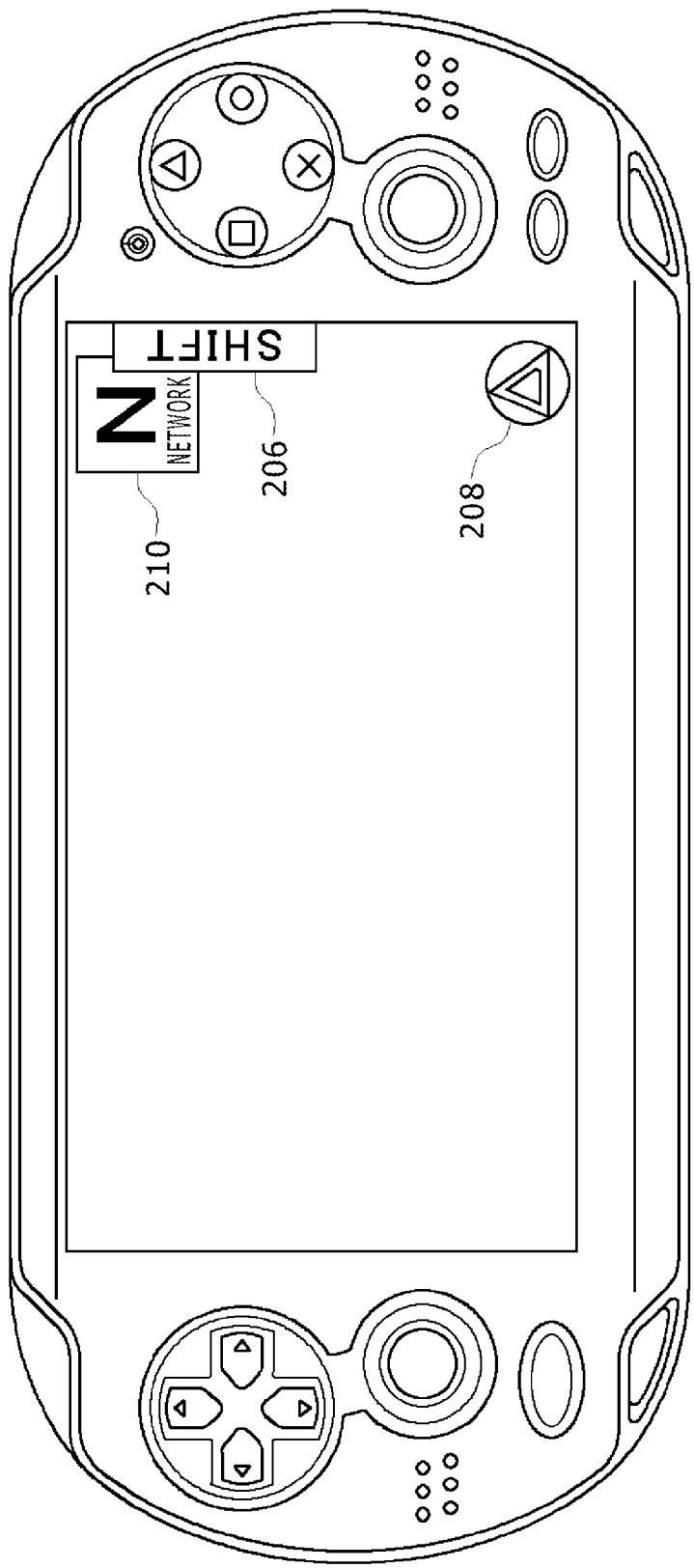
FIG. 14 is a view depicting another example of the graphical user interface displayed on the electronic apparatus according to the embodiment.

FIG. 14 is a view depicting another example of a GUI displayed on the electronic apparatus 10 according to the embodiment. In the example depicted in FIG. 14, a shift key icon 206 having a function similar to that of a so-called "shift key" for changing over a character or a signal to be inputted when it is depressed together with a different character key, a triangle button icon 208 having a function similar to that of the triangle button 22a, and an icon 210 which is displayed in order to request an input from the user are displayed. In the example depicted in FIG. 14, the icon 210 indicates that the electronic apparatus 10 is disconnected from an external network and is a network re-connection icon for attempting re-connection to the external network.

As described above, the electronic apparatus 10 according to the embodiment is configured such that a similar operation can be implemented irrespective of an operation of the operation button 22 and a touch operation of the touch panel 50. Therefore, it is demanded to implement a similar function to a function, for example, of such a button operation as to depress the square button 22d while the L button 26a is depressed through a touch operation of the touch panel 50. To this end, the electronic apparatus 10 displays the shift key icon 206 on the touch panel 50.

The shift key icon 206 is an icon for emulating a shift key in order to implement simultaneous depression of different keys at the same time through a touch operation. The shift key icon 206 is normally long-pressed, namely, "pressed" or "held," and since this is depressed simultaneously with another icon, also the display area of the shift key icon 206 is rather great in comparison with the other icons.

Here, since the shift key icon 206 has the function of changing, when it is depressed simultaneously with a different icon or a different operation button 22, an operation allocated to the different icon or the different operation button 22, preferably it is disposed at a position at which it is less likely to be operated in error. In the example depicted in FIG. 14, the shift key icon 206 is disposed at the right end of an upper portion of the touch panel 50. On the other hand, at a position at which an operation in error is less likely to occur, an icon to which a different function is allocated may possibly be disposed already. For example, in the example of FIG. 14, the network re-connection icon 210 described hereinabove is disposed at a position so near that it partly overlaps with the shift key icon 206.

Further, since the shift key icon 206 is an icon indicative of a region to which a function similar to that of a shift key, namely, a shift operation execution region, is provided when the user presses or holds the shift key icon 206 on the touch panel 50, preferably it is displayed in a region including at least part of the shift operation execution region.

The network re-connection icon 210 is displayed where the electronic apparatus 10 is disconnected from an external network and has a function for attempting re-connection to the network when the user taps the icon 210. Therefore, while the shift key icon 206 is displayed at any time when a touch operation of the user with the shift key icon 206 is carried out, the network re-connection icon 210 is different in that it is displayed only when an input from the user is requested.

In order for the network re-connection icon 210 to accept a tap input from the user, when the user carries out a touch operation with the region within which the network re-connection icon 210 and the shift key icon 206 overlap with each other on the touch panel 50, it is necessary to discriminate whether the operation is a "tap operation" which is a touch operation for a comparatively short period of time or a "press operation" which is a touch operation for a period of time longer than that of the tap operation. Therefore, in a storage section not depicted in the display controlling unit 100, a "tap acceptance time period" determined in order to determine whether a touch operation of a user is a tap operation or a press operation is set. In this sense, the "tap acceptance time period" functions as a "shift key validity reference time period" to be used for discrimination of whether or not the shift key icon 206 is to be validated.

The touch operation management section 104 discriminates the touch operation as a tap operation if the period of time within which the user touches with the touch panel 50 is equal to or shorter than the tap acceptance time period, but discriminates the touch operation as a press operation if the period of time is longer than the tap acceptance time period. Although the particular length of the "tap acceptance time period" may be determined by an experiment taking a response speed of the touch panel 50 and so forth into consideration, it is, for example, 0.2 seconds. Consequently, the touch panel 50 which is not only a display region but also an operation region can be utilized effectively.

Here, the touch operation management section 104 may display, when the user touches with a region in which the shift key icon 206 is disposed on the touch panel 50, the shift key icon 206 even if the period of time of the touch is equal to or shorter than the tap acceptance time period. In this case, before the time period of the touch becomes longer than the tap acceptance time period, even if the shift key icon 206 is displayed, the function of the shift key icon 206 as a shift key is not validated, but after the tap acceptance time period is exceeded, the function as a shift key is validated. Since the shift key icon 206 is displayed immediately when a predetermined position on the touch panel 50 is touched, it is facilitated to seek the display position of the shift key icon 206. Further, even if the shift key icon 206 is displayed, since the function as a shift key is not validated, also it is possible to suppress an operation in error.

As described hereinabove, it is assumed that the shift key icon 206 is depressed simultaneously with a different icon. In this case, the user would touch the display position of the shift key icon 206 on the touch panel 50 while it touches an icon displayed at a different position. Therefore, in a state in which shift key icon 206 is touched, the touched position may be displaced. Therefore, in a storage section not depicted in the display controlling unit 100, a "press acceptance distance" decided for the determination of whether the touch operation of the user is a press operation or a drag operation of a shift key is set.

The touch operation management section 104 decides the touch operation as a press operation if the distance of movement while the user touches the touch panel 50 is equal to or shorter than the press acceptance distance, but decides the touch operation as a drag operation if the distance of movement while the user touches the touch panel 50 is longer than the press acceptance distance. Although a particular length of the "press acceptance distance" may be determined by an experiment taking the arrangement and so forth of an icon displayed on the touch panel 50 into consideration, it is a distance corresponding to a number of pixels, for example, corresponding to 5% of the number of pixels of the touch panel 50 in the widthwise direction. Consequently, an operation in error when both of a drag operation and an emulation of a shift key are used can be reduced.

It is to be noted that, if an icon for which a press operation and a drag operation are to be distinguished from each other exists in addition to the shift key icon 206, then the press acceptance distance may be applied to the icon different from the shift key icon 206. In this case, an icon which responds to a touch operation of the user on the touch panel 50 for a period of time shorter than the tap acceptance time period is referred to as tap acceptance icon, and an icon which responds to a continuation time period of a touch operation which is equal to or longer than the tap acceptance time period is referred to as press acceptance icon. The network re-connection icon 210 described hereinabove is an example of the tap acceptance icon, and the shift key icon 206 is an example of the press acceptance icon. The icons are displayed on the touch panel 50 by the touch operation management section 104.

As depicted in FIG. 14, the triangle button icon 208 having a function similar to that of the triangle button 22a is disposed in a region at the right end of a lower portion of the touch panel 50. If the user touches with the region in which the triangle button icon 208 is disposed, then the touch operation management section 104 displays the triangle button icon 208 indicating the triangle button 22a on the touch panel 50. If the touch operation is ended while the touch time period of the user is within the tap waiting time, then the touch operation management section 104 causes the operation processing section 114 to execute an operation similar to the operation which is executed when the triangle button 22a is depressed.

In this manner, if a touch operation with a predetermined position associated with an operation button 22 is carried out on the touch panel 50, then an icon indicative of the corresponding operation button 22 is displayed. Consequently, the user can confirm which operation is to be executed. It is a matter of course that the operation button 22 associated on the touch panel 50 is not limited to the triangle button 22a, but a plurality of operation buttons 22 may be associated with different positions.

As described above, with the electronic apparatus 10 according to the embodiment, an improved technology for a user interface where both of an operation of an operation button 22 and an operation of the touch panel 50 are involved can be provided.

The present invention has been described based on the embodiment thereof. This embodiment is illustrative, and it can be recognized by those skilled in the art that various modifications are possible in combination of the constituent elements and the processes of the embodiment and that also such modifications are included in the scope of the present invention.

In the embodiment described above, such program guides as depicted in FIGS. 5(a) to 5(c) are taken as examples of an execution screen image of the electronic apparatus 10. The execution screen image which is processed by the image processing section 112 is not limited to screen images of the form of a table like a program guide. In addition, the execution screen image may be applied, for example, to enlargement or reduction of a still picture or a moving picture or may be applied to an operation of a character of an operation target in a content of a game. In the latter case, the discrete screen image changing portion 116 changes stepwise, for every key input accepted by the operation button 22, the display position of the character of the display target. The continuous screen image changing portion 118 successively changes the display position of the character of the operation target following up the input amount of the touch operation accepted by the touch panel 50. However, the position of the character of the operation target which is displayed when the touch operation comes to an end coincides with a position which can be changed by the discrete screen image changing portion 116.

In the foregoing description, such program guides as depicted in FIGS. 5(a) to 5(c) are taken as examples of the execution screen image of the electronic apparatus 10. FIGS. 5(a) to 5(c) are views exemplifying the program guides in which programs of different television stations in different time zones are disposed and in which the axis of abscissa indicates television stations and the axis of ordinate indicates time zones. At this time, when the user taps a television station in the program guide displayed on the touch panel 50, the touch operation management section 104 may change the displayed program guide to a weekly program guide of the television station. In particular, if the user taps the "television X" in FIG. 5(a), then a weekly program guide of the television station X in which the axis of abscissa indicates days of the week of the television station X and the axis of ordinate indicates time zones is displayed. This can be implemented by the touch operation management section 104 detecting a touch operation with the touch panel 50 and the processing unit 110 executing a changing process of the program guide. Further, if the user taps a certain day of the week when a weekly program guide of the television station X is displayed, then the displayed program guide returns to the program guide of the stations for the taped day of the week as depicted in FIG. 5.

In this manner, where choices are displayed in the form of a table on the touch panel 50, by selecting one of the choices in the table on the touch panel 50, an operation associated with the choice may be executed. This makes it possible to implement selection of one of the choices from among the plurality of choices by a single time operation. The number of times of operation can be reduced in comparison with that of operations of the operation button 22, and the usability can be improved.

In the foregoing description, description is given principally of a case in which the display device which displays an execution screen image of the electronic apparatus 10 is the touch panel 50. However, the display device for displaying an execution screen image of the electronic apparatus 10 is not limited to the touch panel 50, but may be, for example, an external monitor or the like. In this case, the touch panel 50 has a function similar to that of a so-called touch pad. This can be implemented by the touch operation management section 104 associating an operation region of the touch panel 50 and a display region of the display device with each other and changing the display of the display device using it that the user operates on the touch panel 50.

It is to be noted that the invention relating to the present embodiment may be specified by the items given below.

(Item 1-1)

An electronic apparatus, including:

an operation button configured to carry out an operation of the electronic apparatus through a key input;

a touch panel serving as a display area of the electronic apparatus and configured to carry out an operation of the electronic apparatus through a touch operation; and an image processing section configured to change and display an execution screen image of the electronic apparatus based on an operation of at least one of the operation button and the touch panel;

the image processing section including a discrete screen image changing portion configured to change the execution screen image of the electronic apparatus stepwise for every key input accepted by the operation button, and a continuous screen image changing portion configured to continuously change the execution screen image of the electronic apparatus in response to an input amount of the touch operation accepted by the touch panel;

the continuous screen image changing portion changing, when the touch operation comes to an end, the screen image until the screen image coincides with a screen image to which the discrete screen image changing portion can change the screen image stepwise.

(Item 1-2)

The electronic apparatus according to Item 1-1, wherein the continuous screen image changing portion is configured such that the screen image can be changed by a single time touch operation to a screen image which is displayed when the discrete screen image changing portion changes the execution screen image of the electronic apparatus stepwise by a plural number of times.

(Item 1-3)

The electronic apparatus according to Item 1-1 or 1-2, wherein the discrete screen image changing portion stepwise selects, every time the operation button accepts a key input, one of a plurality of enlargement and reduction factors determined in advance and enlarges or reduces the execution screen image of the electronic apparatus by the selected enlargement or reduction factor, and the continuous screen image changing portion accepts a pitch-in operation and a pitch-out operation and enlarges or reduces the execution screen image of the electronic apparatus by a rate of change of a distance between fingers on the touch panel as an enlargement or reduction factor for the execution screen image of the electronic apparatus.

(Item 1-4)

The electronic apparatus according to any one of Items 1-1 to 1-3, wherein the continuous screen image changing portion enlarges or reduces, when the pitch-in comes to an end, the execution screen image of the electronic apparatus by a maximum enlargement or reduction factor which is equal to or lower than the enlargement or reduction factor at the time and is for obtaining a screen image to which the discrete screen image changing portion can change the execution screen image, but enlarges or reduces, when the pitch-out operation comes to an end, the execution screen image of the electronic apparatus by a minimum enlargement or reduction factor which is equal to or higher than the enlargement or reduction factor at the time and is for obtaining a screen image to which the discrete screen image changing portion can change the execution screen image.

(Item 1-5)

The electronic apparatus according to any one of Items 1-1 to 1-3, wherein the continuous screen image changing portion enlarges or reduces, when the pitch-in operation or the pitch-out operation comes to an end, the execution screen image of the electronic apparatus by an enlargement or reduction factor which is nearest to the enlargement or reduction factor at the time from among the enlargement or reduction factors by which a screen image to which the discrete screen image changing portion can change the screen image is obtained.

(Item 1-6)

An image display controlling method for being executed by a processor of an electronic apparatus, including:

a step of accepting an operation of an application through a key input of an operation button of the electronic apparatus;

a step of accepting an operation of the application through a touch operation of a touch panel which displays an execution screen image of the electronic apparatus; and a step of changing the execution screen image of the electronic apparatus based on the operation of at least one of the operation button and the touch panel;

the step of changing the execution screen image changing, when the operation through the key input of the operation button is accepted, the execution screen image of the electronic apparatus stepwise for every key j input of the operation button, but continuously changing, when the touch operation of the touch panel is accepted, the execution screen image of the electronic apparatus in response to an input amount of the accepted touch operation and changing, when the touch operation comes to an end, the execution screen image stepwise when the operation through the key input of the operation button is accepted, to change the screen image until the screen image comes to coincide with a screen image which can be displayed.

(Item 1-7)

A program for causing an electronic apparatus to implement an image display controlling function, the image display controlling function including:

a function for accepting an operation of an application through a key input of an operation button of the electronic apparatus;

a function for accepting an operation of the electronic apparatus through a touch operation of a touch panel which displays an execution screen image of the electronic apparatus; and a function for changing the execution screen image of the electronic apparatus based on the operation of at least one of the operation button and the touch panel;

the function for changing the execution screen image changing, when the operation through the key input of the operation button is accepted, the execution screen image of the electronic apparatus stepwise for every key input of the operation button, but continuously changing, when the touch operation of the touch panel is accepted, the execution screen image of the electronic apparatus in response to an input amount of the accepted touch operation and changing, when the touch operation comes to an end, the execution screen image stepwise when the operation through the key input of the operation button is accepted, to change the screen image until the screen image comes to coincide with a screen image which can be displayed.

(Item 1-8)

A computer-readable recording medium on or in which the program according to item 1-7 is stored.

(Item 2-1)

An electronic apparatus, including:

an operation button configured to carry out an operation of the electronic apparatus through a key input;

a touch panel configured to carry out an operation of the electronic apparatus through a touch operation; and a display controlling unit configured to display, in response to the operation of at least one of the operation button and the touch panel, a menu including at least one choice relating to the operation of the electronic apparatus on a display device;

the display controlling unit displaying a menu to be displayed in response to the operation of the operation button and a menu to be displayed in response to the operation of the touch panel such that the menus include at least one common choice and besides the common choice is disposed in layouts different from each other.

(Item 2-2)

The electronic apparatus according to Item 2-1, wherein the display controlling unit includes a button operation management section configured to display the menu in response to an operation of the operation button, and a touch operation management section configured to display the menu in response to an operation of the touch panel.

(Item 2-3)

The electronic apparatus according to Item 2-2, wherein the button operation management section changes arrangement of the choice to be displayed on the display device in response to a key input through the operation button.

(Item 2-4)

The electronic apparatus according to Item 2-2 or 2-3, wherein the touch operation management section discretely displays one or more selectable choices on the display device.

(Item 2-5)

The electronic apparatus according to any one of Items 2-2 to 2-4, wherein the touch operation management section displays, when a touch operation at a predetermined position associated with the operation button is carried out on the touch panel, an icon indicative of the corresponding operation button on the display device.

(Item 2-6)

The electronic apparatus according to any one of Items 2-2 to 2-5, further including an operation processing section configured to execute an operation of the electronic apparatus associated with the choice, the touch operation management section causing, when a touch operation on the choice displayed by the button operation management section in response to an operation of the operation button is carried out, the operation processing section to execute an operation of the electronic apparatus associated with the choice.

(Item 2-7)

A menu displaying method for being executed by a processor of an electronic apparatus, including:

a step of displaying, in response to an operation of an operation button which carries out an operation of the electronic apparatus through a key input, a menu including at least one choice relating to an operation of the electronic apparatus on a display device; and a step of displaying, in response to an operation of a touch panel which carries out an operation of the electronic apparatus through a touch operation, a menu including at least one choice relating to an operation of the electronic apparatus on the display device;

the menu displayed in response to an operation of the operation button and the menu displayed using the touch operation including at least one common choice such that the common choice is disposed in layouts different from each other on the menus.

(Item 2-8)

A program for causing an electronic apparatus to implement a menu displaying function, the menu displaying function including:

a function for displaying, in response to an operation of an operation button which carries out an operation of the electronic apparatus through a key input, a menu including at least one choice relating to an operation of the electronic apparatus on a display device; and a function for displaying, in response to an operation of a touch panel which carries out an operation of the electronic apparatus through a touch operation, a menu including at least one choice relating to an operation of the electronic apparatus on the display device;

the menu displayed in response to an operation of the operation button and the menu displayed using the touch operation including at least one common choice such that the common choice is disposed in layouts different from each other on the menus.

(Item 2-9)

A computer-readable recording medium on or in which the program according to Item 2-8 is stored.

(Item 2-10)

An electronic apparatus, including:

an operation button configured to carry out an operation of the electronic apparatus through a key input;

a touch panel configured to carry out an operation of the electronic apparatus through a touch operation; and a display controlling unit configured to display a tap acceptance icon which responds to a touch operation on the touch panel which continues for a period of time shorter than a tap acceptance time period determined for the determination of whether a touch operation on the touch panel is a tap operation or a press operation depending upon a duration of the touch operation and a press acceptance icon which responds to a touch operation on the touch panel which continues for a period of time longer than the tap acceptance time period on a display device such that the icons at least partly overlap with each other.

REFERENCE SIGNS LIST

4 Portable telephone network, 10 Electronic apparatus, 20 Display apparatus, 21 Front touch pad, Following operation button, 22 Case operation button, 22 Operation button, 23 Direction key, 24 Analog stick, 25 Speaker, HOME button, 28 START button, 29 SELECT button, 30 Front camera, 31 Rear camera, 32 Rear touch pad, 33 Power supply button, 34 Game card slot, 35 Accessory terminal, 37 Memory card slot, 38 Sound input/output terminal, 39 Microphone, 40 Multi-use terminal, 41 SIM card slot, 50 Touch panel, 50 One touch panel, 60 CPU, 64 Main memory, 66 Storage, 67 Motion sensor, 68 Geomagnetism sensor, 69 GPS controlling unit, 70 Operation unit, 71 Wireless communication module, 72 Portable telephone module, SIM card, 76 Game card, 78 Memory card, 80 USB cable, 90 Interface, 92 Bus, 100 Display controlling unit, 102 Button operation management section, 104 Touch operation management section, 110 Processing unit, 112 Image processing section, 114 Operation processing section, 116 Discrete screen image changing portion, 118 Continuous screen image changing portion, 120 Outputting unit, 206 Shift key icon, 208 Triangle button icon, 210 Network re-connection icon.

INDUSTRIAL APPLICABILITY

The present invention is applicable to an electronic apparatus and a menu displaying method.

The invention claimed is:

1. An electronic apparatus, comprising:
an operation button configured to carry out an operation of the electronic apparatus through a key input;
a touch panel configured to carry out an operation of the electronic apparatus through a touch operation; and
a display controller configured to display, a first menu in response to the operation of the operation button, and a second menu in response to the operation of the touch panel, wherein:
each of the first and second menus include a respective plurality of choices relating to the operation of the electronic apparatus, and include at least one common choice,
the respective plurality of choices of the first and second menus are arranged in the display in layouts different from each other, such that one of the first and second menus has the respective plurality of choices arranged in a linear array along a longitudinal axis and the other of the first and second menus has the respective plurality of choices arranged in a non-linear array, where the non-linear array includes: (i) all of the choices arranged in a single arc, (ii) at least one pair of the choices are aligned linearly parallel to the longitudinal axis, and (iii) none of the choices are aligned linearly perpendicularly to the longitudinal axis.

2. The electronic apparatus according to claim 1, wherein the display controller includes
a button operation management controller configured to display the first menu in response to an operation of the operation button, and
a touch operation management controller configured to display the second menu in response to an operation of the touch panel.

3. The electronic apparatus according to claim 2, wherein the button operation management controller changes arrangement of the plurality of choices to be displayed on the display in response to a key input through the operation button.

4. The electronic apparatus according to claim 2, wherein the touch operation management controller discretely displays one or more selectable choices among the plurality of choices on the display.

5. The electronic apparatus according to claim 2, wherein the touch operation management controller displays, when a touch operation at a predetermined position associated with the operation button is carried out on the touch panel, an icon indicative of the corresponding operation button on the display.

6. The electronic apparatus according to claim 2, further comprising
an operation processor configured to execute an operation of the electronic apparatus associated with the plurality of choices,
the touch operation management controller causing, when a touch operation on a selected one of the plurality of choices displayed by the button operation management controller in response to an operation of the operation button is carried out, the operation processor to execute an operation of the electronic apparatus associated with the selected choice.

7. The electronic apparatus of claim 1, wherein:
the display controller is configured to display on a touch panel display of the touch panel: (i) an icon that responds only to a tap on the icon, where the tap is defined as a touch operation on the touch panel display that continues for a period of time shorter than a predetermined time period, and (ii) a shift icon that responds only to a press on the shift icon, where the press is defined as a touch operation on the touch panel display that continues for a period of time equal to or longer than the predetermined time period, wherein the icon and the shift icon are displayed on the touch panel display such that the icon and the shift icon at least partly overlap with each other at rest; and
a touch detection circuit operating to distinguish whether a user of the electronic apparatus invokes the icon or the shift icon on the basis of whether the tap or the press is detected,
wherein the shift icon operates to register a change in function of another icon displayed on the touch panel display.

8. A menu displaying method for being executed by a processor of an electronic apparatus, comprising:
displaying, in response to an operation of an operation button which carries out an operation of the electronic apparatus through a key input, a first menu; and
displaying, in response to an operation of a touch panel which carries out an operation of the electronic apparatus through a touch operation, a second menu, each of the first and second menus including a respective plurality of choices relating to an operation of the electronic apparatus on the display, and include at least one common choice;
wherein the respective plurality of choices of the first and second menus are arranged in the display in layouts different from each other, such that one of the first and second menus has the respective plurality of choices arranged in a linear array along a longitudinal axis and the other of the first and second menus has the respective plurality of choices arranged in a non-linear array, where the non-linear array includes: (i) all of the choices arranged in a single arc, (ii) at least one pair of the choices are aligned linearly parallel to the longitudinal axis, and (iii) none of the choices are aligned linearly perpendicularly to the longitudinal axis.

9. A non-transitory, computer readable storage medium containing a computer program for causing an electronic apparatus to implement menu displaying, the menu displaying including:
  displaying, in response to an operation of an operation button which carries out an operation of the electronic apparatus through a key input, a first menu; and
  displaying, in response to an operation of a touch panel which carries out an operation of the electronic apparatus through a touch operation, a second menu, each of the first and second menus including a respective plurality of choices relating to an operation of the electronic apparatus on the display, and include at least one common choice;
  wherein the respective plurality of choices of the first and second menus are arranged in the display in layouts different from each other, such that one of the first and second menus has the respective plurality of choices arranged in a linear array along a longitudinal axis and the other of the first and second menus has the respective plurality of choices arranged in a non-linear array, where the non-linear array includes: (i) all of the choices arranged in a single arc, (ii) at least one pair of the choices are aligned linearly parallel to the longitudinal axis, and (iii) none of the choices are aligned linearly perpendicularly to the longitudinal axis.

10. An apparatus comprising at least one microprocessor and memory, the memory storing a program, the program causing the apparatus to implement menu displaying, the menu displaying including:
  displaying, in response to an operation of an operation button which carries out an operation of the electronic apparatus through a key input, a first menu; and
  displaying, in response to an operation of a touch panel which carries out an operation of the electronic apparatus through a touch operation, a second menu, each of the first and second menus including a respective plurality of choices relating to an operation of the electronic apparatus on the display, and include at least one common choice;
  wherein the respective plurality of choices of the first and second menus are arranged in the display in layouts different from each other, such that one of the first and second menus has the respective plurality of choices arranged in a linear array along a longitudinal axis and the other of the first and second menus has the respective plurality of choices arranged in a non-linear array, where the non-linear array includes: (i) all of the choices arranged in a single arc, (ii) at least one pair of the choices are aligned linearly parallel to the longitudinal axis, and (iii) none of the choices are aligned linearly perpendicularly to the longitudinal axis.

* * * * *